(12) United States Patent
Goto et al.

(10) Patent No.: US 12,032,600 B1
(45) Date of Patent: Jul. 9, 2024

(54) METHOD AND SYSTEM FOR RECORDING AND ANALYZING LARGE AMOUNTS OF DATA

(71) Applicant: Keysight Technologies, Inc., Santa Rosa, CA (US)

(72) Inventors: Masaharu Goto, Hanno (JP); Naoki Kobayashi, Tokyo (JP)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 0 days.

(21) Appl. No.: 17/361,756

(22) Filed: Jun. 29, 2021

(51) Int. Cl.
G06F 16/28 (2019.01)
G06F 16/2455 (2019.01)

(52) U.S. Cl.
CPC ...... *G06F 16/285* (2019.01); *G06F 16/24553* (2019.01)

(58) Field of Classification Search
CPC .......................... G06F 16/285; G06F 16/24553
See application file for complete search history.

(56) References Cited

U.S. PATENT DOCUMENTS

| | | | | |
|---|---|---|---|---|
| 5,832,182 | A * | 11/1998 | Zhang | G06K 9/6223 706/50 |
| 11,100,365 | B2 | 8/2021 | Kobayashi et al. | |
| 11,429,616 | B2 | 8/2022 | Goto | |
| 2005/0122391 | A1 * | 6/2005 | Fukuda | H04N 21/41407 386/E5.001 |
| 2013/0080451 | A1 * | 3/2013 | Bernstein | G06F 11/3616 707/749 |
| 2018/0101575 | A1 * | 4/2018 | Oberoi | G06F 16/24561 |
| 2019/0037358 | A1 * | 1/2019 | Jenkins | H04L 61/5007 |

(Continued)

FOREIGN PATENT DOCUMENTS

WO    2020038353 A1    2/2020

OTHER PUBLICATIONS

Sandro Vega-Pons, "Partition Selection Approach for Hierarchical Clustering Based on Clustering Ensemble", Springer, pp. 542-549, https://link.springer.com/content/pdf/10.1007/978-3-642-16687-7.pdf (Year: 2010).*

(Continued)

*Primary Examiner* — Mark D Featherstone
*Assistant Examiner* — Brooks T Hale

(57) ABSTRACT

A method of analyzing measurement data includes sorting EDSs into similarity clusters including a representative RDS; labeling the similarity clusters; sorting the EDSs or RDSs into sub-clusters; selecting one of the EDSs or RDSs in each of the sub-clusters as a search seed representative of the sub-cluster; sorting measurement EDSs from measurement data into measurement clusters including a representative measurement RDS; determining for each search seed a most similar one of the measurement EDSs or RDSs; identifying the determined most similar one of the measurement EDSs or RDSs for each search seed as a classification segment corresponding to the search seed; sorting new measurement EDSs or RDSs into classification clusters with the classification segments; classifying all the new measurement EDSs or RDSs in each classification cluster the same as the corresponding classification segment; and determining whether patterns of interest are in the measurement data stream based on the classification clusters.

20 Claims, 9 Drawing Sheets

(56) References Cited

U.S. PATENT DOCUMENTS

| | | | |
|---|---|---|---|
| 2019/0188065 A1* | 6/2019 | Anghel | G06N 3/088 |
| 2020/0081905 A1* | 3/2020 | Zhou | G06F 16/2477 |
| 2020/0320084 A1 | 10/2020 | Goto | |
| 2021/0004639 A1 | 1/2021 | Kobayashi et al. | |

OTHER PUBLICATIONS

Nikita Shiledarbaxi, "Comprehensive Guide to K-Medoids Clustering Algorithm", Apr. 10, 2021, Analytics India Magazine, https://analyticsindiamag.com/comprehensive-guide-to-k-medoids-clustering-algorithm/ (Year: 2021).*

Satyam Kumar, "Hierarchical Clustering: Agglomerative and Divisive—Explained", Towards Data Science, https://towardsdatascience.com/hierarchical-clustering-agglomerative-and-divisive-explained-342e6b20d710 (Year: 2020).*

English translation of WO2020038353A1.

K. Hanumantha Rao et a., "Implementation of Anomaly Detection Technique Using Machine Learning Algorithms," International Journal of Computer Science and Telecommunications, vol. 2, Issue 3, Jun. 2011, pp. 25-31.

Xiaoliang Chen et al., "Self-taught Anomaly Detection with Hybrid Unsupervised/Supervised Machine Learning in Optical Networks," Journal of Lightwave Technology, vol. 37, Issue: 7, Apr. 1, 2019, pp. 1-8.

Alexander Geiger et al., "TadGAN: Time Series Anomaly Detection Using Generative Adversarial Networks, " 2020 IEEE International Conference on Big Data, Dec. 10-13, 2020, pp. 33-43.

Masaharu Goto et al., "Effective Detection of Rare Anomalies from Massive Waveform Data Using Heterogeneous Clustering," 2020 IEEE International Conference on Big Data, Dec. 10-13, 2020, pp. 1-10.

Masaharu Goto et al., "Scaling Up Heterogeneous Waveform Clustering for Long-Duration Monitoring Signal Acquisition, Analysis, and Interaction: Bridging Big Data Analytics with Measurement Instrument Usage Pattern." 2019 EEE International Conference on Big Data, Dec. 9-12, 2019, pp. 1794-1803.

Saket Sathe et al., "Nearest Neighbor Classifiers versus Random Forests and Support Vector Machines," 2019 IEEE International Conference on Data Mining (ICDM), Nov. 8-11, 2019, pp. 1300-1305.

* cited by examiner

METHOD AND SYSTEM FOR RECORDING AND ANALYZING LARGE AMOUNTS OF DATA

BACKGROUND

Data recording systems are now capable of recording quantities of data that are so large that the time to search the recorded data by reading in the stored data serially becomes significant. Data sets in excess of a terabyte are routinely recorded. The time to read a terabyte's worth of data from a conventional disk drive is several hours. Hence, searching the recorded data for a pattern of interest quickly presents challenges.

Mask-test based pattern search defines a pattern as a geometric shape, and searches measurement (target) data fit within the geometric shape, or overhang. However, the target data must be simple enough so that it can be drawn as a geometric shape. Also, false detection may be caused by target data having fluctuation and sometimes overhanging the defined shape boundary. All data must be tested, which is time consuming for huge amounts of data. When there are many patterns to detect, each must be defined by human. Also, it is difficult to analyze marginal cases after the test.

Similarity based pattern search defines representative data, compares the data with target data based on similarity, and determines when the similarity is higher/lower than a defined threshold. However, all data must be tested, which is time consuming for huge amounts of data. When there are many patterns to detect, each must be defined by human.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

Figure 1:
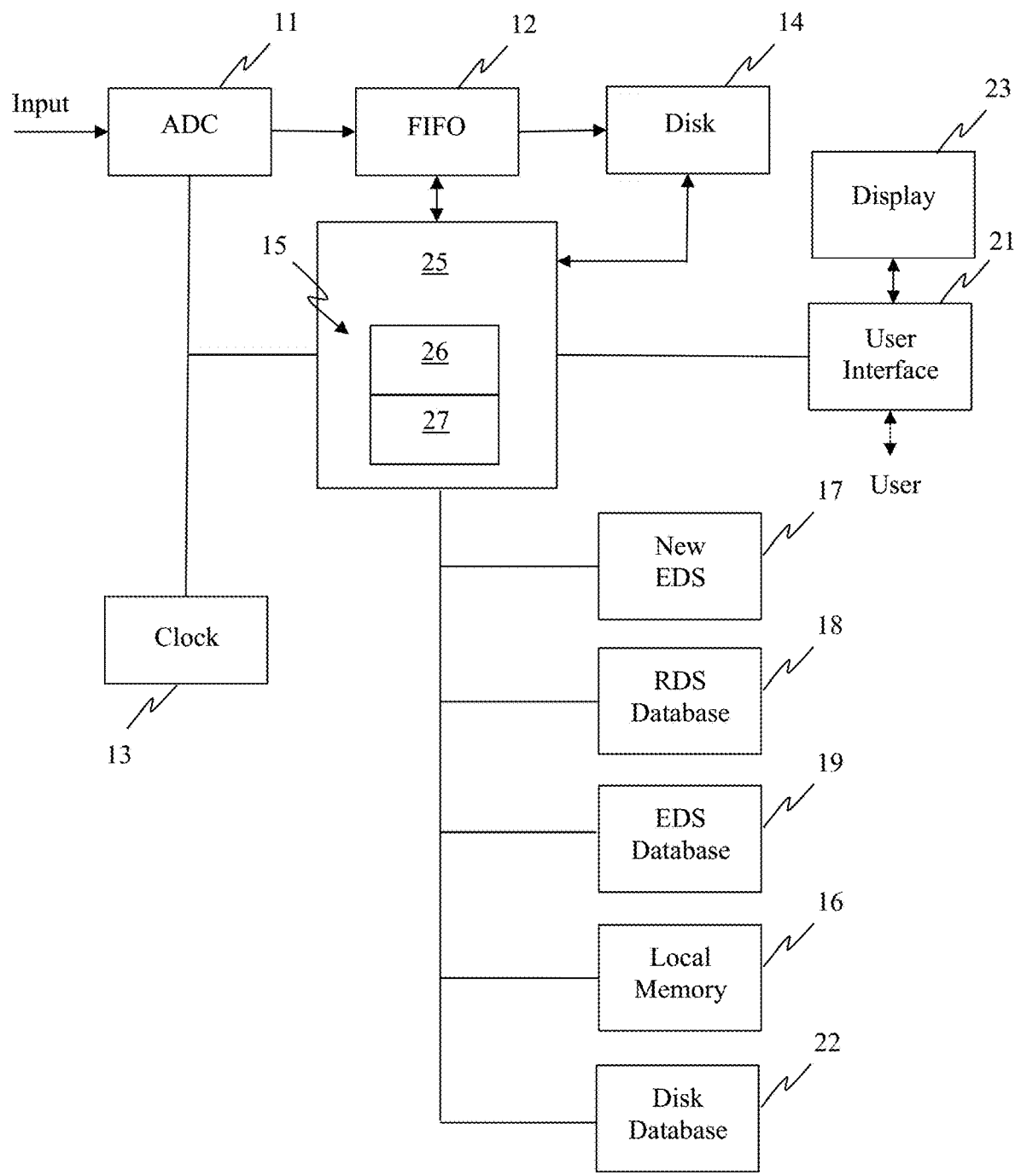
FIG. 1 is a simplified block diagram showing a data recording apparatus for analyzing measurement data, according to a representative embodiment.

In the following detailed description, for purposes of explanation and not limitation, representative embodiments disclosing specific details are set forth in order to provide a thorough understanding of an embodiment according to the present teachings. Descriptions of known systems, devices, materials, methods of operation and methods of manufacture may be omitted so as to avoid obscuring the description of the representative embodiments. Nonetheless, systems, devices, materials and methods that are within the purview of one skilled in the art are within the scope of the present teachings and may be used in accordance with the representative embodiments. It is to be understood that the terminology used herein is for purposes of describing particular embodiments only and is not intended to be limiting. The defined terms are in addition to the technical and scientific meanings of the defined terms as commonly understood and accepted in the technical field of the present teachings.

It will be understood that, although the terms first, second, third etc. may be used herein to describe various elements or components, these elements or components should not be limited by these terms. These terms are only used to distinguish one element or component from another element or component. Thus, a first element or component discussed below could be termed a second element or component without departing from the teachings of the present disclosure.

The terminology used herein is for purposes of describing particular embodiments only and is not intended to be limiting. As used in the specification and appended claims, the singular forms of terms "a," "an" and "the" are intended to include both singular and plural forms, unless the context clearly dictates otherwise. Additionally, the terms "comprises," and/or "comprising," and/or similar terms when used in this specification, specify the presence of stated features, elements, and/or components, but do not preclude the presence or addition of one or more other features, elements, components, and/or groups thereof. As used herein, the term "and/or" includes any and all combinations of one or more of the associated listed items.

Unless otherwise noted, when an element or component is said to be "connected to," "coupled to," or "adjacent to" another element or component, it will be understood that the element or component can be directly connected or coupled to the other element or component, or intervening elements or components may be present. That is, these and similar terms encompass cases where one or more intermediate elements or components may be employed to connect two elements or components. However, when an element or component is said to be "directly connected" to another element or component, this encompasses only cases where the two elements or components are connected to each other without any intermediate or intervening elements or components.

The present disclosure, through one or more of its various aspects, embodiments and/or specific features or sub-components, is thus intended to bring out one or more of the advantages as specifically noted below. For purposes of explanation and not limitation, example embodiments disclosing specific details are set forth in order to provide a thorough understanding of an embodiment according to the present teachings. However, other embodiments consistent with the present disclosure that depart from specific details disclosed herein remain within the scope of the appended claims. Moreover, descriptions of well-known apparatuses and methods may be omitted so as to not obscure the description of the example embodiments. Such methods and apparatuses are within the scope of the present disclosure.

The present disclosure improves upon clustering techniques by finding known patterns of interest (e.g., anomaly patterns) in a huge measurement database using a supervised learning capability. Generally, during a learning process, a user may select search seeds (search patterns) from results of data segment clustering, as described, for example, by U.S. Patent App. Pub. No. 2020/0320084 to Goto, published Oct. 8, 2020, which is hereby incorporated by reference in its entirety. That is, similar data segments are grouped as clusters, and one or more data segments representative of the clusters may be selected as search seeds for the clusters, respectively. Cluster members are similar to each other which guarantees effective matching during inference model processing. In a quick tag clustering mode, search seeds are selected from tag representatives, and in a longer detail-clustering mode, search seeds are selected from a complete database. This configuration allows quick and effective selection of search seeds from a huge database. In order to increase accuracy, multiple cluster representatives may be selected as search seeds for a particular cluster. Also measurement data, such as waveforms and spectrums, are highly dimensional, and therefore may have complex convex and concave shapes in vector space. Selecting multiple search seeds helps approximating the data shape well.

Once the search seeds are determined, data segments from the measurement data may be compared to the search seeds, and the most similar ones of the data segments may be identified as classification segments corresponding to the search seeds, e.g., when the most similar one of the data segments is within a search threshold. New measurement data segments from the input data stream may then be sorted into classification clusters, along with the classification segments respectively corresponding to the classification clusters, using a classification similarity algorithm. All of the new measurement data segments are then classified the same as the classification segments within the same classification clusters, respectively. Accordingly, the new measurement data segments are classified very quickly and efficiently, even for huge amounts data (i.e., one or more terabytes).

According to a representative embodiment, a system and a method are provided for analyzing measurement data collected by a test and measurement instrument. The method includes sorting extracted data segments (EDSs) from initial data in an initial data stream into similarity clusters using an initial similarity algorithm for measuring similarity of the EDSs, where each similarity cluster includes a reference data segment (RDS) representative of the EDSs sorted into the similarity cluster; labeling the similarity clusters; sorting the EDSs or the RDSs of the labeled similarity clusters into sub-clusters using one or more sub-cluster similarity algorithms; identifying a search seed for each of the sub-clusters that is representative of the sub-cluster; sorting measurement EDSs from measurement data in a measurement data stream into measurement clusters using a measurement similarity algorithm for measuring similarity of the measurement EDSs, where each measurement cluster includes a measurement RDS representative of the measurement EDSs sorted into the measurement cluster; determining for each search seed a most similar one of the measurement EDSs or a most similar one of measurement RDSs with respect to the search seed; identifying the determined most similar one of the measurement EDSs or most similar one of the measurement RDSs for each search seed as a classification segment corresponding to the search seed; sorting new measurement EDSs or new measurement RDSs representative of the new measurement EDSs into classification clusters with the classification segments using a classification similarity algorithm; classifying all of the new measurement EDSs or the new measurement RDSs in each of the classification clusters the same as the corresponding classification segment; and determining whether at least one pattern of interest is in the measurement data stream based on the classification clusters.

According to another representative embodiment, a system is provided for recording and analyzing an input data stream. The system includes at least one processor; a user interface in communication with the at least one processor; and at least one memory in communication with the at least one processor. The at least one memory stores instructions that, when executed by the at least one processor, cause the processor to sort EDSs from initial data in the input data stream into similarity clusters using at least an initial similarity algorithm for measuring similarity of the EDSs, where each similarity cluster includes an RDS representative of the EDSs sorted into the similarity cluster, and where each similarity cluster is labeled by the user via the user interface; sort the EDSs or the RDSs of the labeled similarity clusters into sub-clusters using one or more sub-cluster similarity algorithms; select one of the EDSs or one of the RDSs in each of the sub-clusters as a search seed that is representative of the sub-cluster; sort measurement EDSs from measurement data in the input data stream into measurement clusters using a measurement similarity algorithm for measuring similarity of the measurement EDSs, wherein each measurement cluster includes a measurement RDS representative of the measurement EDSs sorted into the measurement cluster; determine for each search seed a most similar one of the measurement EDSs or a most similar one of measurement RDSs with respect to the search seed; identify the determined most similar one of the measurement EDSs or most similar one of the measurement RDSs for each search seed as a classification segment corresponding to the search seed; sort new measurement EDSs or new measurement RDSs representative of the new measurement EDSs into classification clusters with the classification segments using a classification similarity algorithm; classify all of the new measurement EDSs or the new measurement RDSs in each of the classification clusters the same as the corresponding classification segment; and determine whether there is at least one pattern in the input data stream based on the classification clusters.

The manner in which the present disclosure provides its advantages can be more easily understood with reference to a data logging system in which a signal in an incoming data channel is digitized and stored on a memory device, such as a disk drive. The data stream may be viewed as containing signals of interest that are defined by an "extraction algorithm" and the signals between the signals of interest, referred to as Idle signals in the following discussion.

In general, a user of the recorded data needs to be able to understand the various signals in the data and retrieve signals of interest. For the purpose of discussion, it will be assumed that the user does not have a detailed knowledge of all the signals in the data stream to be recorded. It will be assumed that the number of data stream signals is too large for the user to review one at a time. Hence, the user needs to be able to comprehend important features of signals without looking at the entire data stream. For this purpose, it is effective to define clusters of similar signals. By examining representative members of such clusters, the user can gain a better knowledge of the signals that are recorded and specify the parameters needed to retrieve signals of interest.

The present disclosure enables a user to define clusters in the collection of signals that have been recorded based on similarity algorithms that compute similarity measures related to the similarity between signals. Conventional applications of algorithms for clustering objects based on similarity measures demand inherently high computational workloads. Given that a recorded data stream of several terabytes may have more than several millions of signals, clustering the recorded signals in a period of minutes while the user explores the signals is often not practical.

As will be explained in more detail below, the various embodiments detect small clusters of signals of interest during the recording process. These small clusters may be combined to provide larger clusters that coincide with the clusters of signals in the input data stream. The clusters are constructed without requiring a predetermined description of the signals that are to be clustered. Ideally, each of these clusters contains a small portion of a single cluster of the underlying signals that are present in the input stream. Each cluster is started from an observed signal in the input stream as discussed below. The size of the cluster is determined by a similarity algorithm that includes a threshold that determines whether a second signal is to be included in the same cluster as a first signal. The manner in which the clusters are combined or in which a cluster is broken into smaller clusters will be discussed in more detail below.

The digitized data stream may be examined to detect segments of data within the data stream that are of interest without requiring a detailed knowledge of the data segments in advance. The data segments are identified in real time as the data stream passes through the data logger on the way to a mass storage device. It is assumed that the data stream primarily consists of individual signals separated by regions that do not include data segments of interest. Data segments in the data stream that satisfy the extraction algorithm are referred to as extracted data segments (EDSs), and data segments in the data stream that contain a signal that does not satisfy the extraction algorithm are referred to as idle data segments (IDSs).

Ideally each EDS contains the data samples corresponding to one signal of interest without any background samples. However, the need to identify the EDS in a short period of time constraints the extraction algorithm. To find the precise signal segment of interest requires significantly more time than detecting the beginning of the signal by an easily detectable event such as a rising or falling edge across a defined threshold level and defining the end of the signal to be a fixed number of samples relative to the beginning of the signal. If two signals were in fact the same, the EDSs for the two signals would still match. Hence, the extraction algorithm may specify a trigger condition that defines the start of the EDS, and the end of the EDS may be defined to be a fixed number of input samples relative to the start of the EDS. If this approximation interferes with the final clustering, the EDSs can be retrieved from the long-term storage and a clustering based on a more exact end of the signal can be utilized, as described below.

When an EDS is encountered, the EDS is copied to a buffer for further examination and assigned an index value that uniquely identifies the EDS in terms of the location of the EDS in the data stream. A "similarity measure" is also defined for the EDSs by a similarity algorithm. The similarity measure reflects the degree of similarity between any two EDSs. The similarity measure allows EDSs to be grouped into clusters of EDSs that are similar to one another within the degree of similarity. In one aspect of the disclosure, the similarity algorithm includes a threshold, which is compared to the similarity measure. When the similarity measure provided by the similarity algorithm with regard to the EDSs has a predetermined relationship with a threshold (e.g., less than the threshold value), the EDSs are defined as being similar to one another.

When a new EDS is found, the system determines whether the EDS is part of an existing cluster, which has already been found. When the EDS is part of an existing cluster, the existing cluster is updated to reflect the addition of the new EDS. When the new EDS is not sufficiently similar to any of the existing clusters, a new cluster is defined and the new EDS is added to that new cluster.

Each cluster is represented by a reference data segment (RDS). The extraction and clustering are performed in real time during the recording, and hence, a user can view clusters of EDSs that are present in the data stream without the need to recover the EDSs from the now-stored data stream. During the data recording and initial clustering, only the new EDS identified in the data stream is retained in memory. To facilitate the clustering operation, the RDSs are kept in the system memory. After the recording of the data stream has been completed, the clustered EDSs can be recovered and used for further classification.

FIG. 1 is a simple block diagram showing a data recording apparatus, according to a representative embodiment.

Referring to FIG. 1, an incoming data stream input to data recording apparatus 10 is digitized by analog-to-digital converter (ADC) 11, the output of which is stored in a local first-in-first-out (FIFO) buffer 12. It should be noted that the FIFO buffer 12 may be implemented in local memory 16, discussed below. One sample of the data stream is digitized for each clock cycle from clock 13.

The data recording apparatus 10 further includes a computer 25 with a controller 15. The controller 15 described herein may include a combination of memory 26 that stores instructions and an illustrative processor 27 that executes the stored instructions in order to implement all or part of the processes described herein. The controller 15 is configured to control operations of the various components of the data recording apparatus 10. The structural configuration of the controller 15 may include, but is not limited to, processor(s), computer-usable/computer readable storage medium(s), an operating system, application module(s), peripheral device controller(s), slot(s) and port(s), as discussed below.

In the depicted embodiment, the computer 25 includes the controller 15. The controller 15 includes the memory 26 and the processor 27, and interfaces with user interface 21 and display 23, as well as network interfaces (not shown). The computer 25 and/or the controller 15 may be implemented as a processing unit. In various embodiments, the processing unit may include one or more computer processors (e.g., processor 27), digital signal processors (DSPs), central processing units (CPUs), field-programmable gate arrays (FPGAs), application specific integrated circuits (ASICs), or combinations thereof, using any combination of hardware, software, firmware, hard-wired logic circuits, or combinations thereof. Each of the computer 25, the controller 15 and/or the processor 27 may include its own processing memory (e.g., memory 26) for storing computer readable code (e.g., software, software modules) that enables performance of the various functions described herein. For example, the processing memory may store software instructions/computer readable code executable by the processing unit (e.g., computer processor) for performing some or all aspects of methods described herein, including various steps of the method described below with reference to FIG. 3. That is, execution of the instructions/computer readable code generally causes the processing unit of the computer 25 and/or the controller 15 to perform the supervised learning described herein.

The memory 26, and any other memory described herein, including New EDS buffer 17, RDS database 18, EDS database 19, local memory 16 and disk database 22, may be various types of random access memory (RAM), read only memory (ROM) and/or other storage media, including flash memory, electrically programmable read-only memory (EPROM), electrically erasable and programmable read only memory (EEPROM), compact disk read only memory (CD-ROM), digital versatile disk (DVD), registers, latches, flip-flops, a hard disk, a removable disk, tape, floppy disk, blu-ray disk, or universal serial bus (USB) driver, or any other form of storage medium known in the art, which are tangible and non-transitory (e.g., as compared to transitory propagating signals). Memories may be volatile or non-volatile, secure and/or encrypted, unsecure and/or unencrypted, without departing from the scope of the present teachings. The depicted memories and databases may be representative of one or more memories and databases for each, including distributed and networked memories and databases.

The display 23 may be a monitor such as a computer monitor, a television, a liquid crystal display (LCD), an organic light emitting diode (OLED), a flat panel display, a solid-state display, or a cathode ray tube (CRT) display, or an electronic whiteboard, for example. The user interface 21 is configured to enable a user to provide information to and receive information from the computer 25 and/or the controller 15. To this end, the user interface 21 may include one or more of a mouse, a keyboard, a mouse, a trackball, a joystick, a microphone, a video camera, a touchpad, a touchscreen, voice or gesture recognition captured by a microphone or video camera, for example, or any other peripheral or control to permit user interaction. Further, the display 23 and/or the controller 15 may include one or more display interface(s), in which case the display 23 and the user interface 21 may provide a graphical user interface (GUI) for displaying and receiving information to and from the user.

In the depicted exemplary embodiment, the controller 15 maintains an internal register that is incremented at each clock cycle of the clock 13, and provides a unique index for identifying a data segment that begins with the data sample just transferred to the FIFO buffer 12. The new data entry is transferred to the FIFO buffer 12 and the oldest entry in the FIFO buffer 12 is read out on each cycle of the clock 13. On each clock cycle, the controller 15 determines when a data segment of interest has begun or is now completed. The controller 15 may detect the beginning of a data segment of interest, or the controller 15 may examine the content of FIFO buffer 12 to determine when a data segment of interest has begun or is completed. Hardware triggers may be used for determining data segments of interest in the oscilloscope arts, for example, as known to those having skilled in the art. When a data segment of interest is now within the FIFO buffer 12, the controller 15 copies that data sequence from the FIFO buffer 12 to the new EDS buffer 17, notes the location of the new EDS in the data stream, and enters that information in the EDS database 19. When the data segment of interest has just begun with the previous sample, the controller 15 records the sample index at which the data sequence began in the EDS database 19.

The EDS may also be stored on a disk 14 from the FIFO buffer 12. To facilitate subsequent retrieval of the EDS from disk 14, the disk database 22 records the correspondence between records on the disk 14 and the indices assigned to the beginnings of each EDS. In general, the disk 14 is a non-transitory storage medium organized as a plurality of disk records that can be randomly accessed. When the controller 15 needs to recover an EDS that is stored on the disk 14, the disk database 22 is used to determine the disk record number at which the index associated with the EDS begins.

As noted above, a predetermined extraction algorithm defines a data segment to be extracted. In general, an extraction algorithm defines the beginning and end of a data segment that is to become an EDS. The controller 15 executes the extraction algorithm, and identifies the EDS before the data sequence leaves the FIFO buffer 12. The extraction algorithm operates in real time. Real time trigger algorithms that identify the beginning of a data segment of interest in the input to an oscilloscope, for example, are known in the art. The trigger algorithms identify a feature as simple as a rising edge or as complex as a specific signal. In the data recording apparatus 10, the extraction algorithm may select a wide range of signals, since the exact nature of the data segment of interest is not known in advance, and hence, a real time trigger algorithm that identifies a large class of signals is used. Note that the start of the data sequence that is to become an EDS need not occur on the sample that triggered the real time trigger. For example, the EDS may start a predetermined number of samples prior to the sample identified by the real time trigger.

The extraction algorithm must also specify the end of the data segment of interest. In one exemplary embodiment, the extraction algorithm specifies a trigger and a window in the FIFO buffer 12. In this example, the EDS ends at the end of the window and all of the samples within the specified window are part of the EDS even though the signal of interest may terminate prior to the last data value in the window.

In another exemplary embodiment, the extraction algorithm specifies a trigger that signals the end of the data segment to be extracted. For example, the extraction algorithm may require that data values constituting a falling edge that ends at a value below some threshold value and remains at or below that value for some specified number of samples signals the end of the data segment of interest. Accordingly, the EDS database 19 also includes the length of the EDS or equivalent information, such as the index of the last data sample in the EDS. In an embodiment, information specifying the end of the EDS is also included in the EDS database 19.

Once a new EDS is extracted, that EDS is compared to each RDS in a dynamically generated reference library, indicated by RDS (reference) database 18, which stores RDSs and/or information about each RDS. When the new EDS is sufficiently similar to one of the RDSs, the new EDS entry in the EDS database 19 is updated to show that connection, and the RDS database 18 is updated to show the identification of the new EDS as being part of a cluster associated with that RDS. When the new EDS is not sufficiently similar to one of the RDSs, and sufficient processing time remains after comparing the new EDS with all of the RDSs in the RDS database 18, a new RDS representing a new cluster is started using the new EDS as the new RDS, and the relevant data is entered in the RDS database 18. When the new EDS is not sufficiently similar to one of the RDSs, and sufficient processing time is not available, the new EDS entry in the EDS database 19 is marked as having not been assigned. For example, a new EDS may be discovered during the matching of the EDS to the RDSs before all of the RDSs have been considered, and hence, the controller 15 has to use the new EDS buffer 17 for this new EDS.

At the beginning of the processing of the data stream, the controller 15 receives a similarity algorithm for measuring the similarity between data segments. In one aspect of the invention, the similarity algorithm generates a similarity measure that is compared to a predetermined threshold in determining whether two data segments are similar. This similarity algorithm is used by the controller 15 to measure the similarity between an EDS and the RDSs in the RDS database 18. The similarity algorithm may be more easily understood by considering four types of algorithms, discussed below. Three types of similarity algorithms operate on the data values themselves. The fourth type of similarity algorithm operates on "signatures" that are derived from each data segment.

The first type of similarity algorithm directly compares data values of the data segments to determine their similarity. In the simplest case, two data segments have the same length and the similarity algorithm measures a distance between two vectors having components that are the data values. For example, when an EDS has sample values p(i) for i=1 to N, and an RDS (or another EDS) has sample values q(i) for i=1 to N, the Euclidian distance D(p,q) may be determined as follows;

$$D(p, q) = \sqrt{\sum_{i=1}^{N}(p(i) - q(i))^2}$$

The Euclidian distance D(p,q) is a measure of the degree of similarity of the two data segments. When the Euclidian distance D(p,q) is less than a predetermined threshold value T, the two data segments are defined as being similar to one another. When the Euclidian distance D(p,q) is greater than a predetermined threshold value T, the two data segments are defined as being not similar to one another. Different distance functions may be used in place of the Euclidian distance as the similarity measure, without departing from the scope of the present teachings. As will be discussed in more detail below, in some applications, a particular distance function may have less of a computational workload in computing the function may be implemented.

The second type of similarity algorithm normalizes the data segments before measuring the distance between the data segments. In some applications, the shape of the data segments is more important than the matching of the data segments. For example, the data segments may represent two signals that differ in amplitude but have the same shape. That is, p(i)=Kq(i). When the user's goal is to look for signals having the same shape independent of the amplitudes of the signals, each data segment is first normalized by dividing it by a constant that depends on the average amplitude before computing the distance between the segments. In one example, the constant is the maximum value of the data segment. In another example, the constant is the average value of the absolute values of the data values in the data segment.

The third type of similarity algorithm looks for a match between a smaller data segment and a larger data segment. This is useful in cases in which the user wants to find data segments that contain some smaller sequence. This situation arises when the data segments are of different lengths. Basically, the user wishes to look for a larger data sequence that contains a sequence that is similar to the smaller data sequence. In one example, the distance between the smaller data segment and a corresponding portion of the larger data segment is measured. When the smaller data segment is p(i) for i=1 to m, and the larger data segment is q(i) for i=1 to N, then the distance D(p, q, k) for k=0 to (N-m-1) may be determined as follows:

$$D(p, q, k) = \sqrt{\sum_{i=1}^{m}(p(i+k) - q(i))^2}$$

The distance D is determined for the various values of k and the minimum value of the distance D is chosen as the distance to be compared with the threshold value T. It should be noted that the procedure may be applied when the values of p and q can be normalized as described above. To reduce the processing time, k may be restricted to a small range. When the user has reason to believe that the two data sequences are aligned at the beginning, k may be restricted to zero.

The above similarity algorithms operate directly on the data segments being compared. This type of similarity algorithm is intuitive for individuals who are not experts in clustering analysis. However, the workload to compute the similarity measures when classifying the EDSs can be large when the EDSs are large. In addition, depending on the type of similarity the user wishes to use to classify the EDSs, the fourth type of similarity function may be preferred.

The fourth type of similarity algorithm derives a signature vector from each data segment. The distance between the signature vectors can then be used to measure the similarity in a manner analogous to that described above. In this type of similarity measurement, the signature vectors for all of the EDSs have the same components, even when the data segments differ in length. In general, the number of components in a signature vector is much smaller than the number of data values in an EDS (or an RDS), and hence, the computational workload of performing the distance measurements is substantially reduced; however, this savings is offset by the additional computational workload of deriving the components of the signature vector from the corresponding data segment. In general, a component of the signature vector can be any function of the data segment that is likely to differentiate that data segment from other data segments. In the case in which the extraction algorithm generates data segments of different lengths, one component of a signature vector could be the length of the data segment. Other components may be derived from finite impulse response filters applied to the data segment. For example, components representing the amplitude of frequency components of the data segment may be used.

The process of identifying the EDSs and updating the RDS database 18 to account for each new EDS found may be carried out in real time. For the purposes of the present disclosure, a process is said to be carried out in real time when the process can be completed without reducing the rate with which the data stream enters a data logger according to the present disclosure. In the data extraction portion of the processing, the input data stream moves through the FIFO buffer 12 and then out to the disk 14; hence, during the extraction processing, i.e., identifying the new EDS, the controller 15 is able to identify the data segment that satisfies the extraction algorithm and move that data segment to a buffer in memory before part of the data segment moves out of the FIFO buffer 12.

The time to complete the preliminary classifications and update the RDS database 18 depends on the amount of memory and the degree of parallel processing available. In one aspect, the new EDS is moved to the new EDS buffer 17 and compared to the RDS in the RDS database 18 (or to another EDS). The time needed to check a new EDS against the RDSs may be improved by keeping the RDSs in memory during the comparisons.

In addition, the time to find a match may be reduced by performing the matching in an order that reflects the likelihood of finding a match to an existing RDS (or EDS). The RDS database 18 includes a count of the EDS matches that have already been found for each RDS. Those counts are a measure of the likelihood that the corresponding RDS will be the match to the next EDS. Hence, performing the matching in the order of the counts associated with each RDS will improve the speed of finding a match, if one exists.

When the likelihood changes over time, a separate likelihood variable that decays over time may be utilized. Each time an EDS is assigned to an RDS, the likelihood count for that RDS is incremented by one. Periodically, the likelihood counts are reduced by multiplying the counts by a decay factor that is less than one. The search for a match is carried out in an order defined by the likelihood count.

Finally, it should be noted that the matching process time may be reduced by parallel processing. The matching of the new EDS to one of the RDSs may proceed in parallel with the matching of the EDS to another of the RDSs. Hence, the matching time can be reduced by approximately a factor of M, where M is the number of parallel processors that are available. The distance computations can also be performed with graphical processor cores in an advanced graphic display card; hence, the speed improvement through parallel processing can be a factor of more than 1000.

It should also be noted that in the matching process, the controller 15 need only process one EDS on average in the average time needed to find and extract an EDS. When there are sufficient buffers for storing the new EDSs awaiting processing, the system need only process one EDS in the average time to find a match, not the longest time to find a match.

It is still possible that the matching of an EDS to an RDS in the RDS database 18 fails to be completed before the buffer capacity for holding new EDSs waiting for matches is exceeded. In this case, the entry in the EDS database 19 for the EDS that failed is marked as having failed to find a match, and the processing proceeds to the next EDS that is waiting to be matched, thus freeing the buffer that held the failed EDS for use by a new EDS. The failed EDSs may be processed at the end of the recording period or when buffer space becomes available do to a low rate of discovery of new EDSs during a subsequent portion of the recording period.

In one aspect of the disclosure, the RDS database 18 is empty at the start of the data recording operation. As new EDSs are encountered, some of the new EDSs become RDSs, as discussed above. For example, a first EDS will become a first RDS. A second (new) EDS may become a second (new) RDS, or may be labeled as part of the cluster represented by the previously created first RDS according to the similarity measure.

In another aspect of the disclosure, the user may input one or more RDSs to be used in the comparisons. The RDSs may have been found in another data stream that was analyzed by an analogous apparatus, created by the user, or provided by the manufacturer of the data recording apparatus 10, for example.

In one aspect of the disclosure, the RDS database 18 and associated RDSs that are held in memory during the recording and initial processing are available for viewing by the user during the recording to help the user understand the data stream that is being logged. In one embodiment, the user is presented with a list of RDSs ordered by count of the number of EDSs that were found to be similar to that RDS. The user may then select one or more RDSs for display.

As noted above, the RDS database 18 includes an entry for each RDS that, among other things, lists the identification of each EDS that was found to be similar to that RDS. In one aspect, the identification is the index in the data stream at which that EDS was found. The EDS is listed here because the similarity measure between that EDS and the RDS met some predetermined threshold condition. For example, the distance between the EDS and RDS was less than some threshold value. When the threshold condition of the similarity algorithm is too loose, a large number of EDS will be associated with the RDS. More importantly, a single RDS may contain signals from two or more different clusters of signals in the input data stream. As will be explained in more detail below, such an RDS is to be avoided.

When the threshold condition of the similarity algorithm is too tight, there will be many more RDSs and the size of the cluster defined by each RDS will be smaller. In principle, the smaller RDS clusters can be combined to provide a larger cluster during the post recording processes. However, having a large number of small RDS clusters during data acquisition substantially increases the computational workload associated with matching a new EDS to an RDS cluster. Accordingly, there is a tradeoff between the threshold condition and specificity of the RDS clusters.

In one aspect of the disclosure, the RDS database entries for each RDS also include the actual measure of similarity for each EDS associated with that RDS. A histogram of these similarity measures is optionally provided to a user at the user's request by the controller 15 during the recording process and during the post recording processing. By viewing the histogram, especially in cases in which a large number of EDSs are associated with an RDS, the user can gain insight with respect to the structure of the cluster. For example, when the histogram reveals multiple peaks, the cluster could contain EDSs from multiple clusters of the signals in the input data stream, and hence, require that the RDS be expanded into a plurality of new RDSs as described below.

At the end of the recording phase, the data recording apparatus 10 will have generated two databases. The first database is a lossless database (EDS database 19) that contains all of the data segments that satisfied the extraction algorithm. The lossless database includes the location of each EDS in the recorded data stream and all of the RDSs that are similar to that EDS. Using the lossless database, the controller 15 can access any EDS that is related to any RDS. The second database is a tag database (RDS database 18) that contains representative data or tags (RDSs) of the clusters, and associated meta data, that were generated during the recording process. The information in the tag database identifies the RDSs and the EDSs that are related to a given RDS, the location of the EDS that started each RDS in the recorded data stream, and other information about the RDSs as discussed above.

In some cases, it may be useful to examine one or more of the IDSs. For example, when the extraction algorithm defines a fixed window relative to a trigger location, the window may be too small to capture all of the signal associated with the trigger. The IDS after the EDS can provide the missing portion of the truncated EDS. The index on the disk of the IDS after an EDS can be calculated from the index of the end of that EDS.

As noted above, there may be EDSs that failed classification with respect to the RDS database 18 because the time available to make all of the comparisons was not sufficient. The EDS database 19 tags any such EDSs as failed EDSs. In the post recording processing, these failed EDSs can be revisited. The location of each failed EDS is recorded in the EDS database 19. The failed EDS can be retrieved from the recorded data stream since its location in the data stream is known. Furthermore, the entire recorded data stream does not need to be played to reach the failed EDS when the recorded data stream is on a disk drive (e.g., disk 14) or similar random access storage device. Hence, the failed EDS can be retrieved and compared against the current RDS database 18. At this point, the failed EDS can be associated with one or more of the RDSs using the similarity algorithm, or if no sufficiently similar RDS is found, a new RDS can be defined for that failed EDS, in the same manner discussed above.

One of the goals of the data logging process described herein is to catalog signals that are similar to one another, and hence, allow the user to understand the various signal types in the recorded data. While each RDS represents a cluster of EDSs, the collection of RDSs does not necessarily allow the user to comprehend the clustering of the underlying set of EDSs. For example, there may be a much larger number of RDSs than there are clusters in the underlying set of EDSs. The present disclosure provides two tools for providing insight into the clustering of the underlying signals.

The first tool operates on the RDSs to find groups of RDSs that are part of the same underlying signal cluster. Each RDS entry in the RDS database 18 includes an EDS which is a representative of the small group of EDSs. Hence, clustering selected ones of the RDSs allows the user to build a larger cluster of similar EDSs. Since the number of RDSs is substantially less than the number of EDSs, clustering the RDSs can be performed with a substantially smaller computational workload. To simplify the nomenclature in the following discussion, a cluster of RDSs will be referred to as a group.

Figure 2:
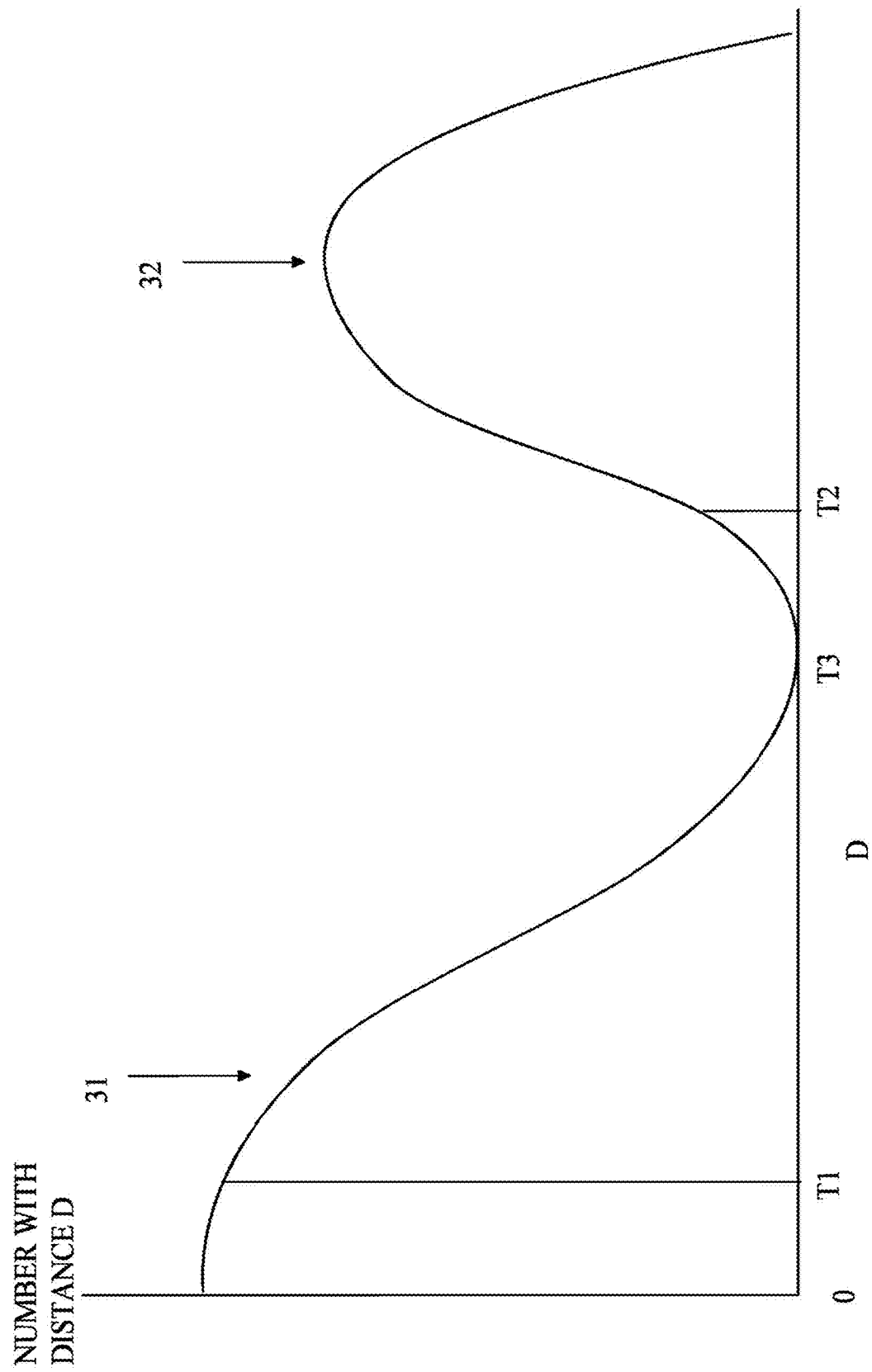
FIG. 2 is an exemplary plot of the distribution of distances of extracted data segments (EDSs) as a function of distance from the RDS, according to a representative embodiment.

The goal of clustering the RDSs may be more easily understood with reference to a simple example. Consider an RDS that is at or near the center of a cluster of signals in the input data stream. Assume that the similarity algorithm measures the distance between two data segments. In particular, consider the distance from the EDS that forms the basis of that RDS to each of the other EDS in the EDS database 19. FIG. 2 is an exemplary plot of the distribution of such distances as a function of the distance from the RDS, according to a representative embodiment.

Referring to FIG. 2, the horizontal axis indicates a distance D between EDSs and the RDS, and the vertical axis indicates the number of EDSs at each distance D. A cut off distance used to define the EDSs that correspond to this RDS is shown at T1. The cluster represented by the RDS only contains EDSs corresponding to a first cluster 31 of the input signals. Ideally, this RDS is to be combined with other RDSs such that the resulting group has an effective cut off distance as shown at T3.

As noted above, when the original cut off distance is too large, as shown at T2, for example, the cluster represented by the RDS will contain EDSs corresponding to a second cluster 32 in the input signals. When such an RDS is combined with another RDS, the resulting RDS would also contain EDSs belonging to two clusters in the input signal, and hence, the resulting group would not be restricted to one cluster in the input signals. As noted above, a frequency distribution such as that shown in FIG. 2 can be helpful in identifying cluster that is too large.

The RDSs are grouped in a manner analogous to that used to create an RDS from the EDSs. In forming the groups, a similarity measure and a threshold are defined by a similarity algorithm in a manner analogous to that described above, comparing RDSs to one another as opposed to comparing EDSs to an RDS. These definitions can be provided by the user via the user interface 21 or by the system itself. In the simplest case, the same similarity algorithm that was used to create the RDSs is used to create the groups by altering the threshold to be less selective in admitting a candidate RDS into the group. However, a different similarity relationship may be utilized.

Initially, there are no groups, and hence, a first group consists of the first RDS that is tested. In one aspect of the disclosure, the RDS having the highest number of associated EDSs is chosen as the first RDS to start this first group. This aspect is based on a model in which an underlying cluster of the EDSs is centered at or near one of the RDSs. Hence the RDS with the highest count is likely to be located at or near the center of such a cluster. The first group is populated by examining the remaining RDSs that have not yet been assigned to a group, and assigning any remaining RDSs to the group when the similarity measure for the remaining RDSs and the first RDS indicates that the RDSs meet the similarity condition. The process is then repeated with the RDS having the next maximum count of associated EDSs that has not yet been assigned to a group. When there are no more non-assigned RDSs, the process is completed. Alternatively, since there may be a relatively small number of RDSs, more computationally expensive hierarchical clustering may be used to sort the RDSs into groups.

The user may view the EDSs corresponding to the RDSs in each group on the display 23 in response to an appropriate command given to the computer 25 and/or the controller 15. This display may be restricted to the EDS defined as the center of each RDS or to all of the EDSs that are associated with the group. These displays allow the user to determine if the signals that have been grouped using the similarity measure do in fact appear to be similar. Finally, the user may view a frequency distribution such as that shown in FIG. 2 to help determine whether the grouping process has been carried out too far.

When the number of groups is still too large, the process can be repeated using the same similarity algorithm but with a different threshold selected to be less stringent in finding similarity. In addition or alternatively, the process may be repeated using a different similarity algorithm. A practical restriction on the similarity algorithm is that it must be able to operate on any two EDSs. For example, a similarity algorithm that operates on EDSs of different lengths can be constructed by setting the similarity measure such that the two EDSs will be non-similar when the length of the two EDSs is not substantially the same. When the length of the two EDSs is substantially the same, then a distance function is calculated and compared to a threshold to determine whether the two EDSs are similar. In another example, the similarity algorithm could first derive a signature for each of the EDSs to be compared, and then measure the distance between the signatures to determine if the two EDSs are similar.

The above description assumes a particular type of similarity algorithm for re-clustering the RDSs. However, other clustering techniques could be utilized with the first tool, without departing from the scope of the present teachings.

As noted above, when the similarity criteria used to produce a cluster represented by one of the RDSs is too lax, that cluster may contain a very large number of EDSs. In addition that RDS may have associated EDSs that span more than one cluster in the input signal clusters. Accordingly it is useful to replace such an RDS with a plurality of new RDSs that have smaller numbers of EDSs associated with each new RDS. In one aspect of the disclosure, a cluster associated with an RDS can be broken into smaller clusters by retrieving all of the EDSs associated with the RDS and re-clustering those EDSs using a similarity cut off threshold that is more restrictive. The re-clustering proceeds in a manner analogous to that described above with respect to the original clustering of the EDSs. That is a first new RDS is defined to include the first EDS of the group of extracted EDSs. Each successive EDS is then compared to the first new RDSs. When the first EDS is similar to the new RDS as determined by the new cut off threshold, the first EDS is associated with that new RDS. When the first EDS is not sufficiently similar to new RDS (or to any other new RDSs), another second RDS is defined and the first EDS is used to start the second RDS. When the new set of RDSs is included in the RDS database 18, the grouping of the RDSs can be repeated.

The clustering of the RDSs after recording is based on the extraction algorithm used in selecting the EDSs that were grouped into the RDSs. First of all, as mentioned above, each RDS may represent multiple clusters. Such an RDS can be broken down to smaller clusters either by re-generating the RDS as described above, or if the computing resource allows, loading all EDSs associated with the RDS and running clustering algorithms directly on those EDSs. Alternatively, when the extraction algorithm operates by selecting all the samples within a window of fixed size position relative to a start trigger, for example, the resulting EDSs will only approximate data segments that include just the signal of interest. When the window is too large, the EDSs will include a significant number of background samples that can distort the distance calculation. Similarly, when the window is too small, part of the signal of interest will be cut off. As noted above, an IDS following an EDS can be accessed and the lost portion of a signal that was truncated by the fixed window can be restored. Accordingly, the EDSs are only approximations to the data signals of interest.

The second tool mentioned above allows the user to correct these approximations and hence improve the clustering. For example, when the EDS extraction algorithm is based on a fixed window, the computer 25 and/or the controller 15 may execute a trimming algorithm that changes the stopping location associated with an EDS from the end of the fixed window to a location consistent with the physical end of the signal of interest. For example, when the end of the EDS is a string of samples representing the background level in the data channel, the end of the EDS can be defined to be the location of the last data value that is above the background. Similarly, when the EDS was truncated by the fixed window and there is an IDS adjacent to the EDS in question, then the end of the EDS can be modified to show the end of the data in the IDS.

After the EDSs have been updated to correct for these approximations, the new collection of EDSs can then be clustered into RDSs using the same similarity algorithm or a different similarity algorithm. The new set of RDSs can then be clustered into groups as discussed above with respect to the first tool. It should be noted that when sufficient computational resources are available, all of the EDSs corresponding to the RDS that is being re-clustered could be assembled and re-clustered as a group to provide a new set of RDSs to replace the original large RDS.

During the post recording processing using the above two tools, the user can view the actual EDSs corresponding to one or more clusters. When the EDSs within a cluster do not appear sufficiently similar to the user, the user can change the similarity algorithm and/or the threshold within the same similarity algorithm used in determining similarity. In one aspect, the user can select the similarity algorithm from a predetermined list of similarity algorithms.

In the above-described embodiments, the RDS database 18 starts out empty and is populated as the recording proceeds. However, one or more RDSs are defined prior to the commencement of the recording can also be constructed. These initial RDSs allow the user to look for specific signals while still learning the contents of the data stream as the data stream is received. The RDSs could have been found in another data stream that was analyzed by an analogous apparatus, or created by the user, for example.

Similarity algorithms in which the EDS and RDS are normalized prior to measuring the similarity between the two data segments can also be utilized. For example, each data segment may be divided by the maximum value of the samples in the data segment so that the comparison measures similarity in shapes. In another example, the EDS is multiplied by a constant and the similarity computed. The process may be completed for different predetermined constants, and the highest similarity measure used.

In one aspect of the disclosure, the processing is organized to provide as much preliminary data as possible while recording the data stream in real time. The higher levels of processing are then carried out in the background or after the data recording is completed. The processing at the time of recording a large amount of data enables extraction of a data segment that satisfies the extraction condition, preliminary classification of a similar data segment based on the extracted data segment, and detection and registration of an RDS while executing recording of input data, which requires a real-time operation performance. The result of the preliminary classification can first be used to execute classification by the cluster analysis for preliminarily classified RDSs. Accordingly, the analysis processing time and response to user queries can be provided without requiring the user to wait for the data to be recovered from the long term recording device.

In other words, the processing puts the highest priority on high-speed processing, and thus does not identify an RDS with the highest similarity, but rather adopts an RDS, which is similar to an EDS with the accuracy of a predetermined threshold value, as a tag of the EDS as soon as such an RDS is found, to thereby end the processing. The processing of obtaining complete classification determination is suspended until the execution of classification of detailed data segments is performed by clustering.

The number of EDSs and RDSs that are stored can be adjusted by setting the classification threshold value for similarity evaluation. As a result, it is possible to reduce the period of time for preliminary classification at the expense of mis-classifications during the preliminary processing.

As noted above, the processing time can be reduced using parallel processing as described above. In addition, by examining RDSs in an order that reflects the number of EDSs associated with each RDS, the processing time can be further reduced. In addition, the similarity algorithm used in the preliminary classifications may be chosen to have a low computational load, and then the accuracy of the clustering may be improved in later processing using a more complex similarity algorithm.

Up until this point, the RDSs and corresponding clusters of similar EDSs have been created using an unsupervised learning technique, where the user has no preexisting knowledge of the incoming data stream. The unsupervised learning technique provides fast and efficient clustering of EDSs by categorizing huge amounts of measurement data into clusters of data that are similar each other, which helps to identify unknown anomalies in the data set. Benefits of this clustering may be extended, however, to find known anomaly patterns in a huge measurement database by adding supervised learning capability to the unsupervised learning results. Generally, the supervised learning technique classifies data into known categories, and then finds a known anomaly pattern in the classified data. The supervised learning technique, according to various embodiments, enables the user to quickly search for the known anomaly patterns, for example, without having to test every data sample by determining classification segments from search seeds (inference models), and efficiently sorting similar EDSs extracted from the measurement data into classification clusters defined by the classification segments. Analysis results of unknown anomalies from a different database may be leveraged by selecting target anomalies as the search seeds, which are used to determine the classification segments. There is no need for the user to define a search pattern, although it is still possible if desired. Also, search patterns may be automatically selected by similarity algorithms, which is beneficial when there are many patterns to search. Marginal false-negatives and false-positives also may be easily examined since the user has flexibility in choosing different similarity thresholds.

Figure 3A:
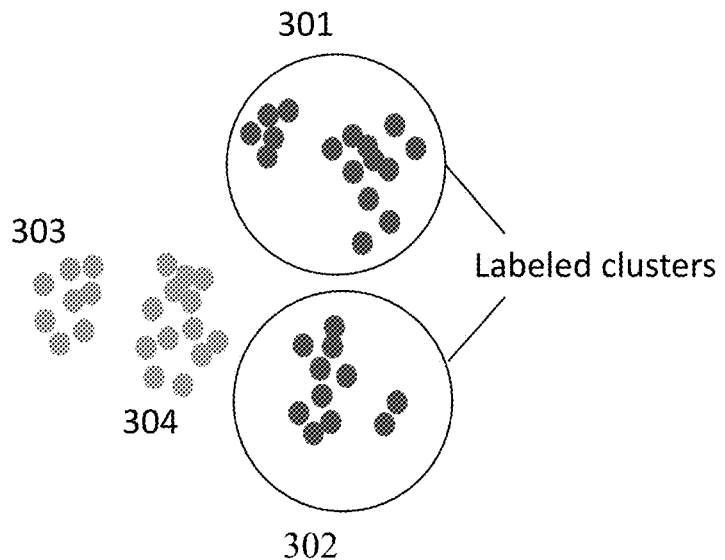
FIGS. 3A-3C show an example of the learning process for identifying search seeds, according to a representative embodiment.
Figure 3B:
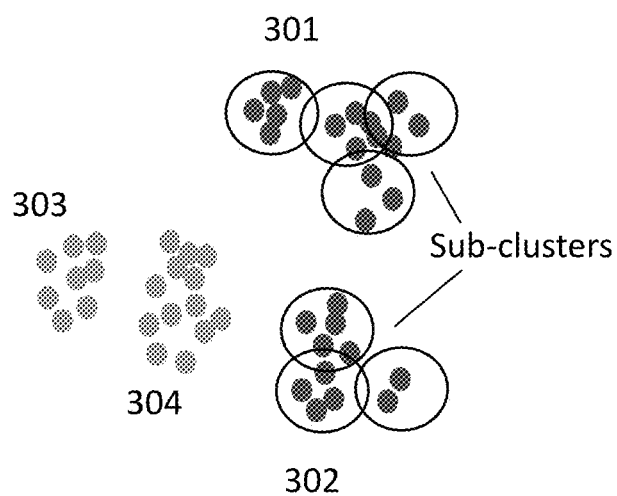
Figure 3C:
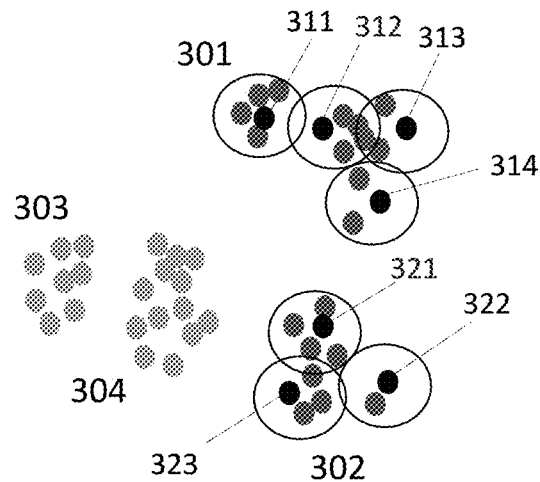

To begin, a learning process is performed under control of the controller 15 to provide search seeds representative of measurement data being input to the data recording apparatus 10. FIGS. 3A-3C show an example of the learning process for identifying search seeds, according to a representative embodiment.

The learning process begins by clustering EDSs extracted from an input data stream into initial clusters, according to the clustering process described above. That is, EDSs are extracted from an initial input data stream and clustered according to similarity by comparing the EDSs with RDSs respectively representing multiple clusters. The source of the input data stream may be a device under test (DUT), or a data recorder that is playing back a previously recorded data stream, for example. As discussed above, the input data stream is sequentially provided to the data recording apparatus 10, portions of the input data stream are stored in the FIFO buffer 12, and EDSs are extracted from the buffered portions according to an extraction algorithm executed by the controller 15. Each EDS is compared to RDSs in the RDS database 18 in order to determine similarity with the RDSs based on an initial similarity algorithm. The initial similarity algorithm provides a similarity measure for measuring a similarity parameter (e.g., distance or shape) between the EDS and the RDSs, and a threshold to which the similarity measure is compared for making the similar/not similar determination.

When the EDS is determined to be sufficiently similar to one of the RDSs, the EDS is associated with that RDS, and information indicating the association is stored in the RDS database 18 and/or the EDS database 19. When the EDS is determined to be not sufficiently similar to any of the RDSs, the EDS (or information identifying the EDS) is stored in the RDS database 18 and/or the EDS database 19 as a new RDS, to which subsequently extracted EDSs are compared along with the other RDSs. This results in the EDSs being initially sorted into initial clusters associated with the RDSs, such that each initial cluster includes multiple EDSs that are similar to one another, as defined by the initial similarity algorithm.

As discussed above, the initial clusters optionally may be processed by the controller 15 to provide new clusters, which have either finer granularity (more restrictive) or coarser granularity (less restrictive) than the initial clusters with regard to similarity. Finer granularity may be achieved by applying a more restrictive similarity algorithm (e.g., decreasing the similarity threshold of the initial similarity algorithm), and dividing some of the initial clusters into multiple smaller new clusters that include EDSs that are more similar to one another in accordance with the more restrictive similarity algorithm. Coarser granularity may be achieved by applying a less restrictive similarity algorithm (e.g., increasing the similarity threshold of the initial similarity algorithm), and combining two or more initial clusters into one larger new cluster that includes EDSs that are less similar to one another in accordance with the less restrictive similarity algorithm. The desired granularities of the new clusters may be selected, for example, based on anomalies identified using the initial clusters.

For example, dividing some of the initial clusters to form similarity clusters having finer granularity with regard to similarity may include identifying a lower threshold granularity, identifying the RDSs having associated EDSs that are too close in similarity based on the threshold granularity, and generating the smaller clusters by dividing some of the initial clusters of the identified RDSs to form the new smaller clusters having the finer granularity. Likewise, combining some of the initial clusters to form new clusters having coarser granularity with regard to similarity may include identifying an upper threshold granularity, identifying the RDSs having associated EDSs that are too distant in similarity based on the upper threshold granularity, and generating the new larger clusters by combining selected ones of the initial clusters of the identified initial RDSs to form the new clusters having coarser granularity.

The initial clusters, or the new clusters having different granularities derived from the initial clusters, may be collectively referred to as "similarity clusters." The user labels the similarity clusters via the user interface 21, for example, that the user wants to subject to further processing. The labeling helps the user to organize and easily identify the similarity clusters for understanding further data analysis. FIG. 3A shows an example of four representative similarity clusters 301, 302, 303 and 304 of EDSs, or of RDSs representing groups of EDSs, where similarity clusters 301 and 302 have been selected and labeled by the user. The EDSs/RDSs of the labeled similarity clusters 301 and 302 are indicated by medium shading, and the EDSs/RDSs of the unlabeled similarity clusters 303 and 304 are indicated by light shading.

The controller 15 sorts the EDSs, or the RDSs representing groups of the EDSs, of each of the similarity clusters 301 and 302 into sub-clusters. Sorting the EDSs into sub-clusters of EDSs provides more detail with regard to the input data stream, but increases the computational workload. Sorting the RDSs into sub-clusters of RDSs provides less detail, but decreases the computational workload and significantly increases processing speed. FIG. 3B shows the similarity cluster 301 sorted into four sub-clusters, and the similarity cluster 302 sorted into three sub-clusters.

In various embodiments, when the initial clusters are first divided into smaller new clusters according to a more restrictive similarity algorithm (e.g., the initial similarity algorithm with decreased similarity threshold), as discussed above, the EDSs of these new clusters may be further divided into first sub-clusters based on a first sub-cluster similarity algorithm that is even more restrictive than this more restrictive similarity algorithm. When the initial clusters are first combined into new clusters according to a less restrictive similarity algorithm (e.g., the initial similarity algorithm with increased similarity threshold), as discussed above, the RDSs of these new clusters may be divided into second sub-clusters based on a second sub-cluster similarity algorithm that is more restrictive than this less restrictive similarity algorithm. Generally, the second sub-clusters represent significantly more EDSs than the first sub-clusters since they involve clustering RDSs, each of which represents multiple EDSs, as opposed to clustering the EDSs themselves.

One EDS or RDS in each sub-cluster is selected as a search seed, representative of that sub-cluster. For example, a median EDS or RDS of each sub-cluster may be selected as the search seed. The selection may be performed by the user via the user interface 21 by viewing the sub-clusters on the display 23, or performed automatically by the controller 15 by weighing relative positioning among the EDSs/RDSs within the respective sub-clusters. FIG. 3C shows selected search seeds (black shading) in each of the sub-clusters, indicated as search seeds 311-314 in the labeled similarity cluster 301, and as search seeds 321-323 in the labeled similarity cluster 302. In an embodiment, more than one search seed may be identified for each of the sub-clusters. The search seeds may be referred to as inference models since they effectively model the corresponding sub-clusters for purposes of subsequent processing.

Thus, at the end of the learning process, at least one search seed is selected to represent each of the sub-clusters. That is, one or more of the EDSs in each of the sub-clusters of EDSs is selected as a search seed representative of that sub-cluster, and one or more RDSs in each of the sub-clusters of RDSs is selected as a search seed representative of that sub-cluster. The search seeds define search patterns for subsequently acquired measurement data, discussed below. In alternative embodiments, other learning algorithms may be incorporated using these search seeds, such as deep learning neural network or support vector machine algorithms, for example, as would be apparent to one skilled in the art. Since the number of search seeds is much less than the number of RDSs or EDSs, these computationally expensive learning algorithms may be exercised more efficiently using the search seeds as a learning pattern.

Once the search seeds have been selected, the data recording apparatus 10 continues to receive the input data stream as measurement data, and to extract EDSs which are associated with RDSs. Using the search seeds, the controller 15 is able to quickly classify the EDSs and/or RDSs of the input data stream by associating them with search seeds, respectively, which may be referred to as inference processing. How the classifying is performed does not depend on whether the search seeds have been selected using detail sub-clustering or tag sub-clustering, mentioned above.

Figure 4A:
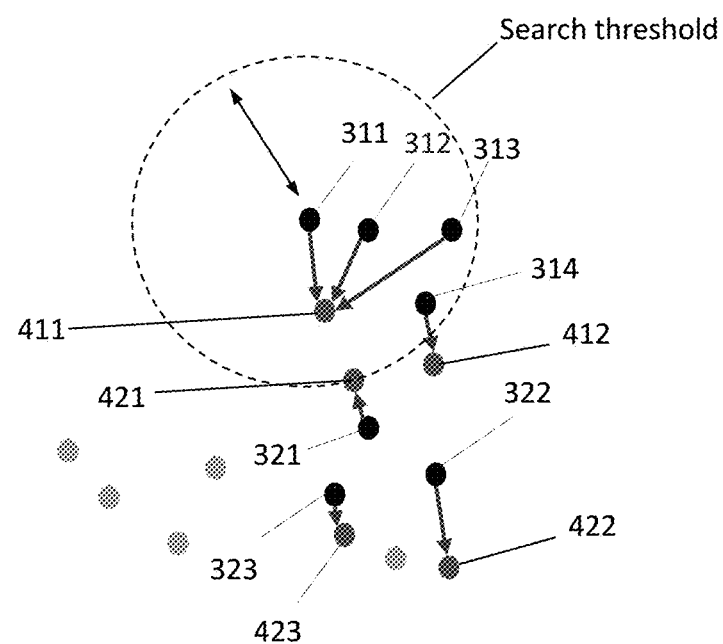
FIGS. 4A-4C show an example of classifying measurement data using search seeds for tag clustering, according to a representative embodiment.
Figure 4B:
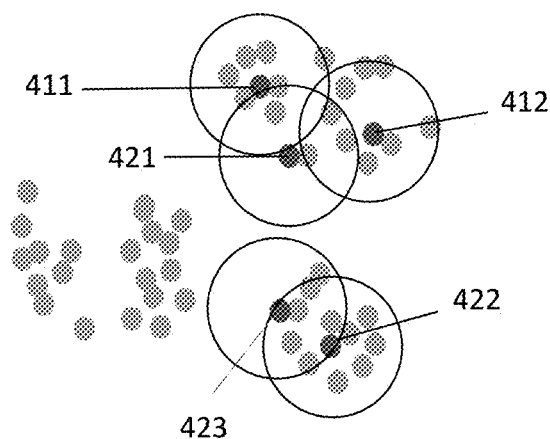
Figure 4C:
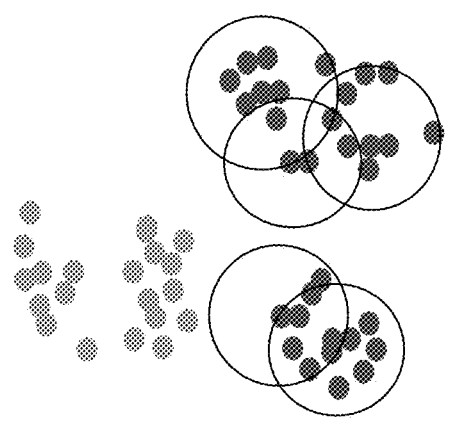

FIGS. 4A-4C show an example of classifying measurement data using search seeds for tag clustering, according to a representative embodiment. As discussed above, the input data stream (measurement data) is sequentially provided to the data recording apparatus 10, portions of the input data stream are stored in the FIFO buffer 12, and EDSs are extracted from the buffered portions according to an extraction algorithm executed by the controller 15. Also as discussed above, the similar EDSs are clustered by associating them with RDSs representative of the clusters. That is, as the input data stream is sequentially provided to the data recording apparatus 10, portions of the input data stream are stored in the FIFO buffer 12 and EDSs are extracted from the buffered portions according to the extraction algorithm executed by the controller 15. Each EDS is compared to RDSs in the RDS database 18 in order to determine similarity with the RDSs based on a measurement similarity algorithm, which may be the same as or more or less restrictive than the initial similarity algorithm, without departing from the scope of the present teachings. When the EDS is determined to be sufficiently similar to one of the RDSs, the EDS is associated with that RDS, and information indicating the association is stored in the RDS database 18 and/or the EDS database. When the EDS is determined to be not sufficiently similar to any of the RDSs, the EDS (or information identifying the EDS) is stored in at least the RDS database 18 as a new RDS, to which subsequently extracted EDSs are compared along with the other RDSs. This results in the EDSs being sorted into measurement clusters associated with the RDSs, such that each measurement cluster includes multiple EDSs that are similar to one another, as defined by the measurement similarity algorithm.

Then, for each search seed identified during the learning process, described above, the nearest RDS (tag representative) is determined, and may be considered a classification segment. In an embodiment, the nearest RDS is determined by performing a known nearest neighbor algorithm for each search seed, which identifies a most similar one of the RDSs with respect to each search seed. A search threshold may be associated with each of the search seeds, in which case the nearest RDS is considered to be a classification segment only when the nearest RDS is within this search threshold. Otherwise, the nearest RDS is disregarded. The search threshold is determined in accordance with a corresponding similarity measure, which may be much less restrictive than the similarity measure of the initial similarity algorithm and/or the tag sub-clustering similarity algorithm used for comparing EDSs with RDSs, for example.

FIG. 4A shows selected search seeds (black shading) provided by the learning process, indicated as representative search seeds 311-314 and 321-323 from FIG. 3C. For purposes of illustration, the search seed 311 is shown with its associated search threshold indicating a maximum distance at which the nearest RDS may be considered. It is understood that each of the other search seeds 312-314 and 321-323 likewise have search thresholds, although not depicted in FIG. 4A. For each of the search seeds 311-314 and 321-323, the nearest RDS (medium shading) is determined from among RDSs in the input data stream (light shading). The nearest RDSs are indicated by arrows from the corresponding search seeds. In the depicted example, the search seeds 311-313 share the same nearest RDS 411. Also, the search seed 314 has nearest RDS 412, the search seed 321 has nearest RDS 421, the search seed 322 has nearest RDS 422, and the search seed 323 has nearest RDS 423. Since the nearest RDSs 411-412 and 421-423 are within the corresponding search thresholds, they are considered to be classification segments. In alternative embodiments, other learning algorithms, discussed above, may classify RDSs, instead of classifying EDSs. Since the number of RDSs is much less than the number of EDSs, these learning algorithms may be exercised more efficiently by processing only RDSs.

In an alternative embodiment, the matching of the search seeds with the nearest RDSs is done in reverse. That is, for each RDS, the nearest search seed is determined from among the search seeds selected during the learning process, above (e.g., search seeds 311-314 and 321-323). This may result in some differences in pairing between search seeds and nearest RDSs. For example, in FIG. 4A, the nearest RDS 411 would be paired only with the search seed 312 as being the nearest RDS. Otherwise, matching the search seeds to nearest RDSs, or matching RDSs to nearest search seeds, does not substantially affect the result.

The data recording apparatus 10 continues to receive the input data stream as measurement data, from which EDSs are extracted and associated with RDS. The RDSs are sorted into classification clusters by the controller 15 by comparing the RDSs to the classification segments (RDSs 411-412 and 421-423) using a classification similarity algorithm. The classification similarity algorithm may be the same as the initial similarity algorithm and/or the measurement similarity algorithm, or may be more or less restrictive, without departing from the scope of the present teachings. Any RDSs that do not meet the similarity criteria with regard to the classification segments may be disregarded.

FIG. 4B shows the classification segments indicated by the RDSs 411-412 and 421-423 (medium shading) with corresponding classification thresholds based on the classification similarity algorithm. As shown, the RDSs (light shading) that are sufficiently similar to the RDSs 411-412 and 421-423, as determined using the classification similarity algorithm, are associated with the RDSs 411-412 and 421-423, respectively, in the classification clusters. All of the EDSs associated with the RDSs in each classification cluster are then classified the same as the classification segment associated with that classification cluster. Classifying the EDSs within each classification cluster the same speeds up the inference process for multiple target data. FIG. 4C shows the uniform classification of the EDSs within the same classification cluster by changing the shading of the EDSs from the light shading to the medium shading of the RDSs 411-412 and 421-423. Accordingly, the EDSs extracted from the measurement data are quickly and efficiently classified along with other similar EDSs. One or more patterns of interest in the measurement data may be more quickly and easily identified by analyzing these classification clusters.

Figure 5A:
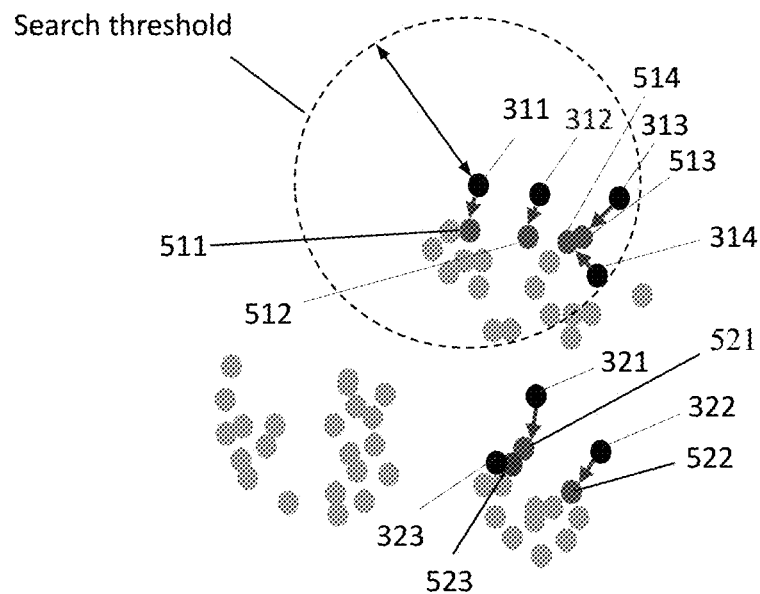
FIGS. 5A-5C show an example of classifying measurement data using search seeds for detail clustering, according to a representative embodiment.
Figure 5B:
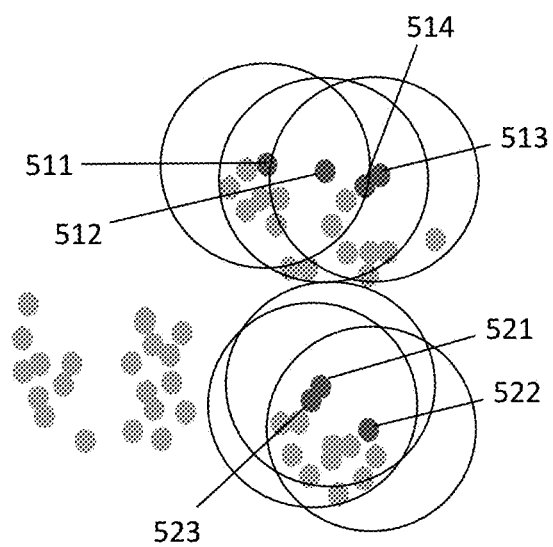
Figure 5C:
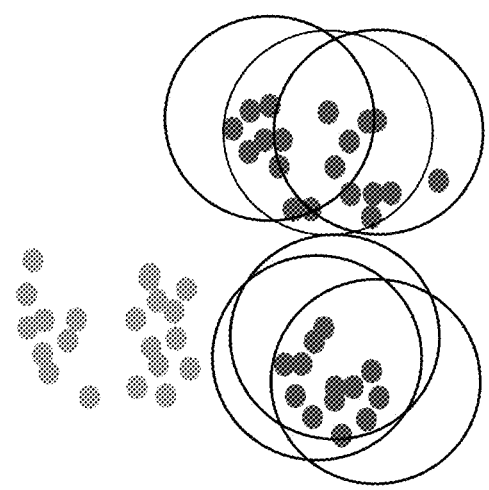

FIGS. 5A-5C show an example of classifying measurement data using search seeds for detail clustering, according to a representative embodiment. Again, as discussed above, the input data stream (measurement data) is sequentially provided to the data recording apparatus 10, portions of the input data stream are stored in the FIFO buffer 12, and EDSs are extracted from the buffered portions according to an extraction algorithm executed by the controller 15. In this embodiment, the EDSs do not need to be clustered with similar EDSs by associating them with RDSs representative of the clusters.

For each search seed identified during the learning process, as described above, the nearest EDS extracted from the input data stream is determined, and may be considered a classification segment. In an embodiment, the nearest EDS is determined by performing a known nearest neighbor algorithm for each search seed, which identifies a most similar one of the EDSs with respect to each search seed. In an embodiment, in order to reduce the number of EDSs being compared using the nearest neighbor algorithm, the search may be limited to EDSs that have been previously associated with or identified as RDSs, respectively. In alternative embodiments, using other learning algorithms, such as support vector machine and deep learning neural network, the search may be limited to EDSs that have been previously associated with or identified as RDSs, respectively. A search threshold may be associated with each of the search seeds, in which case the nearest EDS is considered to be a classification segment only when the nearest EDS is within this search threshold. Otherwise, the nearest EDS is disregarded. The search threshold is determined in accordance with a corresponding similarity measure, which may be much less restrictive than the similarity measure of the initial similarity algorithm used for comparing EDSs with RDSs, for example.

FIG. 5A shows selected search seeds (black shading) provided by the learning process, indicated as representative search seeds 311-314 and 321-323 from FIG. 3C. For purposes of illustration, the search seed 311 is shown with its associated search threshold indicating a maximum distance at which the nearest EDS may be considered. It is understood that each of the other search seeds 312-314 and 321-323 likewise have search thresholds, although not depicted in FIG. 5A. For each of the search seeds 311-314 and 321-323, the nearest EDS (medium shading) is determined from among EDSs in the input data stream (light shading). The nearest EDSs are indicated by arrows from the corresponding search seeds. In the depicted example, the search seed 311 has nearest EDS 511, the search seed 312 has nearest EDS 512, the search seed 313 has nearest EDS 513, the search seed 314 has nearest EDS 514, the search seed 321 has nearest EDS 521, the search seed 322 has nearest EDS 522, and the search seed 323 has nearest EDS 523. Since the nearest EDSs 511-514 and 521-523 are within the corresponding search thresholds, they are considered to be classification segments. Any EDSs that do not meet the similarity criteria with regard to the classification segments may be disregarded.

The EDSs are sorted into classification clusters by the controller 15 by comparing the EDSs to the classification segments (EDSs 511-514 and 521-523) using a classification similarity algorithm. The classification similarity algorithm may be the same as the initial similarity algorithm and/or the measurement similarity algorithm, or may be more or less restrictive, without departing from the scope of the present teachings.

FIG. 5B shows the classification segments indicated by the EDSs 511-514 and 521-523 (medium shading) with corresponding classification thresholds based on the classification similarity algorithm. As shown, the EDSs (light shading) that are sufficiently similar to the EDSs 511-514 and 521-523, as determined using the classification similarity algorithm, are associated with the EDSs 511-514 and 521-523, respectively, in the classification clusters. All of the EDSs in each classification cluster are then classified the same as the classification segment associated with that classification cluster. FIG. 5C shows the uniform classification of the EDSs within the same classification clusters by changing the shading of the EDSs from the light shading to the medium shading of the EDSs 511-514 and 521-523. Accordingly, the EDSs extracted from the measurement data are quickly and efficiently classified along with other similar EDSs. One or more patterns of interest in the measurement data may be more quickly and easily identified by analyzing these classification clusters.

Figure 6A:
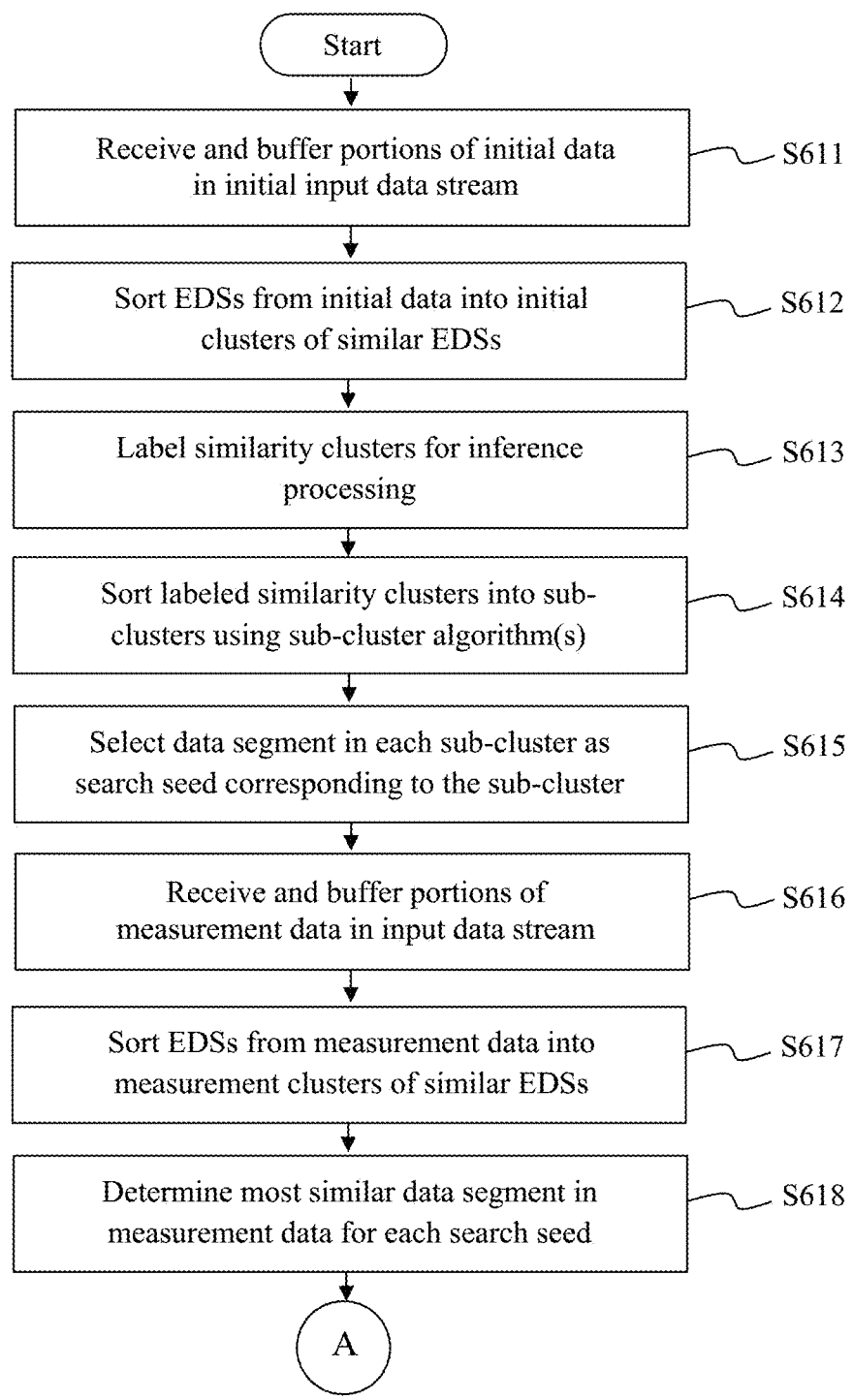
FIGS. 6A and 6B show a flow diagram showing a method of analyzing measurement data, according to a representative embodiment.
Figure 6B:
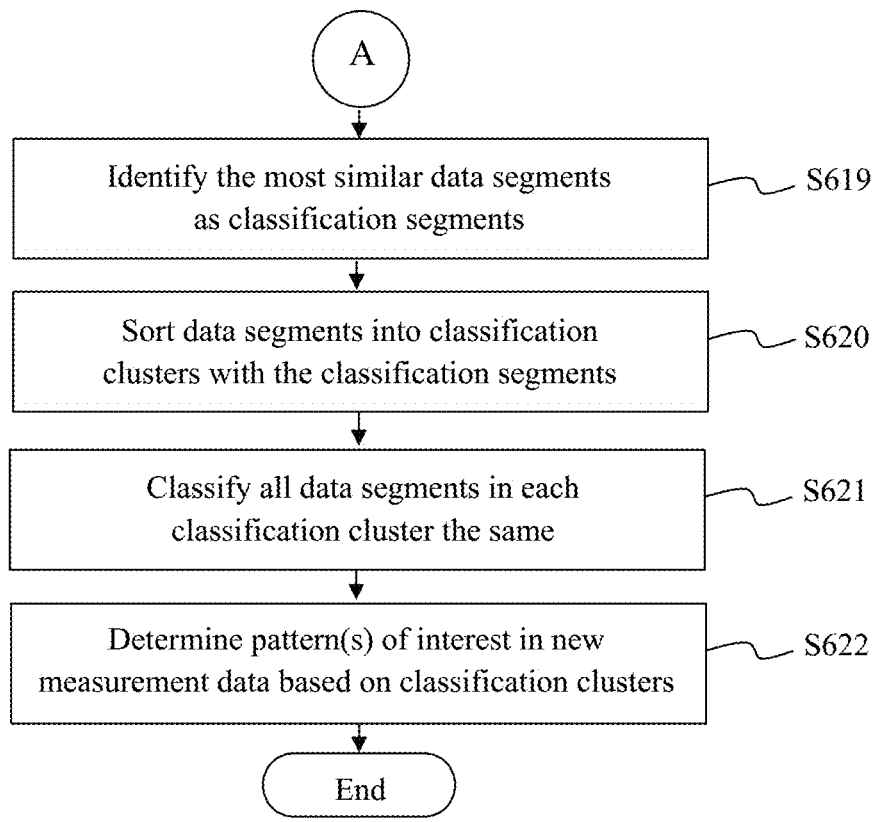

FIGS. 6A and 6B show a flow diagram showing a method of analyzing measurement data, according to a representative embodiment.

Referring to FIG. 6A, initial data in an input data stream is sequentially received, and portions of the initial data are stored in a buffer (e.g., FIFO buffer 12) in block S611. The data stream includes an ordered sequence of initial data provided by a DUT or by data recorder playing back a previously recorded data from a DUT, for example.

In block S612, EDSs are extracted from the stored (buffered) portions of the initial data, and sorted into initial clusters based on relative similarity to one another. For example, the EDSs may be compared with previously identified RDSs based on an initial similarity algorithm with an initial similarity measure, where the RDSs are representative of corresponding initial clusters. The initial similarity algorithm provides an initial similarity measure for measuring a similarity parameter (e.g., distance or shape) between each EDS and the RDSs, and an initial similarity threshold to which the similarity measure is compared for making the similar/not similar determination. When an EDS is determined to be sufficiently similar to one of the RDSs, the EDS is associated with that RDS, and information indicating the association is stored in a database (e.g., EDS database 19 and/or RDS database 18). When an EDS is determined to be not sufficiently similar to any of the RDSs, the EDS (or information identifying the EDS) is stored as a new RDS, to which subsequently extracted EDSs are compared along with the other RDSs. As a result, the EDSs extracted from the initial data are sorted into initial clusters associated with the RDSs, such that each initial cluster includes multiple EDSs that are similar to one another, as defined by the initial similarity algorithm.

Optionally, the initial clusters may be divided or combined into new clusters having either finer granularity (more restrictive) or coarser granularity (less restrictive) than the initial clusters with regard to similarity, respectively. When an initial cluster is divided, the resulting new clusters are smaller and include EDSs that are more similar to one another. When an initial cluster is combined with one or more other initial clusters, the resulting new cluster is larger and includes EDSs that are less similar to one another. The desired granularities of the new clusters may be selected, for example, based on anomalies identified using the initial clusters. As mentioned above, the initial clusters and the new clusters (if any) derived from the initial clusters, may be referred to as "similarity clusters."

In block S613, the similarity clusters are labeled, indicating the similarity clusters that will be subjected to inference processing. The similarity clusters may be labeled, for example, by a user using a user interface (e.g., user interface 41) and a display (e.g., display 43). For example, using a GUI, the user may select from among multiple displayed similarity clusters, where the GUI automatically provides a text box or a drop down list in response to each selection to enable the user to enter a label associated with the selection. Alternatively, or in addition, the similarity clusters may be labeled automatically. For example, labels may be imported from previously created search seeds, where accuracy may be improved with new data sets.

In block S614, data segments from the labeled similarity clusters are sorted into sub-clusters using one or more sub-cluster similarity algorithms. Generally, each of the similarity clusters include EDSs and/or at least one RDS. Thus, sorting the labeled similarity clusters into sub-clusters may include sorting the EDSs into first sub-clusters of EDSs using a first sub-cluster similarity algorithm and/or sorting the RDSs into second sub-clusters of RDSs using a second sub-cluster similarity algorithm, as discussed above. Referring to block S612, when the initial clusters are optionally divided into smaller new clusters according to a more restrictive similarity algorithm than the initial similarity algorithm, sorting the labeled similarity clusters may include dividing the EDSs of these new clusters into first sub-clusters based on a first sub-cluster similarity algorithm that is even more restrictive than this more restrictive similarity algorithm. Also, when the initial clusters are optionally combined into larger new clusters according to a less restrictive similarity algorithm than the initial similarity algorithm, sorting the labeled similarity clusters may include dividing the RDSs of these new clusters into second sub-clusters based on a second sub-cluster similarity algorithm that is more restrictive than this less restrictive similarity algorithm. Generally, the second sub-clusters represent significantly more EDSs than the first sub-clusters since they involve clustering RDSs, each of which represents multiple EDSs, as opposed to clustering the EDSs themselves.

In block S615, one of the data segments in each of the sub-clusters is selected as a search seed, which is representative of that sub-cluster. For example, a representative EDS in each of the first sub-clusters is selected as the search seed for that first sub-cluster, and a representative RDS in each of the second sub-clusters is selected as the search seed for that second sub-cluster. For example, a median EDS or RDS of each sub-cluster may be selected as the search seed. Selecting data segments as the search seeds for respective sub-clusters may be performed manually by the user via a user interface or automatically by a controller (e.g., controller 15).

In block S616, measurement data in an input data stream is sequentially received, and portions of the measurement data are stored in a buffer. The input data stream includes an ordered sequence of measurement data provided by a DUT or by data recorder playing back a previously recorded data from a DUT, for example. In an embodiment, the input data stream simply continues after the search seeds have been selected, and the initial data become measurement data going forward in the process.

In block S617, EDSs are extracted from the stored (buffered) portions of the measurement data, and sorted into measurement clusters with associated RDSs based on relative similarity to one another, as discussed above with reference to the initial clusters in block S612. For example, the EDSs may be compared with previously identified RDSs based on a measurement similarity algorithm, as discussed above, where the RDSs are representative of corresponding measurement clusters. The measurement similarity algorithm provides a measurement similarity measure for measuring a similarity parameter (e.g., distance or shape) between each EDS and the RDSs, and a measurement similarity threshold to which the similarity measure is compared for making the similar/not similar determination. The measurement similarity algorithm may be the same as or different from the initial similarity algorithm without departing from the scope of the present teachings.

When an EDS is determined to be sufficiently similar to one of the RDSs, the EDS is associated with that RDS, and information indicating the association is stored in a new database (e.g., EDS database 19 and/or RDS database 18). When an EDS is determined to be not sufficiently similar to any of the RDSs, the EDS (or information identifying the EDS) is stored as a new RDS, to which subsequently extracted EDSs are compared along with the other RDSs. As a result, the EDSs extracted from the measurement data are sorted into measurement clusters associated with the RDSs, such that each measurement cluster includes multiple EDSs that are similar to one another, as defined by the measurement similarity algorithm.

In block S618, a most similar data segment (EDS or RDS) in the measurement data is determined for each search seed selected in block S615. This determination may be done post-processing, meaning that the determination is made regarding EDSs and/or RDSs are already recorded in the new database. Determining the most similar data segment may be performed by a controller (e.g., controller 15) using a nearest neighbor algorithm, for example, which are known in the relevant art. When using EDSs to identify the most similar data segments, the EDSs do not necessarily need to be first sorted into measurement clusters with associated RDSs, as discussed above with reference to block S612. When using RDSs, the nearest neighbor algorithm may be used in reverse, identifying the most similar search seed for each RDS, as discussed above.

In block S619, the determined most similar data segment (EDSs or RDSs representative of the EDSs) for each search seed is identified as a classification segment corresponding to that search seed. In an embodiment, the determined most similar data segment is identified as a classification segment only when the determined most similar data segment is also within a search threshold of the corresponding search seed. The search threshold may be determined in accordance with a corresponding similarity measure, which may be much less restrictive than the similarity measure of the initial similarity algorithm and/or the measurement similarity algorithm used for comparing EDSs with RDSs, for example.

Referring to FIG. 6B, the EDSs and/or the RDSs representative of the EDSs stored in the new database are sorted into classification clusters in block S620. The classification clusters are associated with the classification segments, determined in block S619. The EDSs and/or the RDSs are sorted into the classification clusters using a classification similarity algorithm. Sorting into the classification clusters may be performed on the EDSs and/or the RDSs being extracted and sorted into measurement clusters in real-time.

In block S621, all of the data segments in each of the classification clusters are classified the same as the corresponding classification segment in that classification cluster. In other words, all of the data segments in each classification cluster have a uniform classification, whether the data segments are EDSs or RDSs. Accordingly, the data segments quickly and efficiently classified based on the classification similarity algorithm.

In block S622, the classification clusters are analyzed to identify patterns of interest in the measurement data of the input data stream, including anomaly patterns, for example. Identifying the patterns of interest may be done post-processing using stored measurement data, or in real time while the measurement data is being received. A pattern of interest refers generally to any pattern in the measurement data that is identifiable only in the context of reviewing large quantities of data that are organized according to similarity measures, as discussed above. An anomaly pattern in particular refers to any pattern of interest in the measurement data that is out of the ordinary, as would be apparent to those skilled in the art.

While the above-described embodiments use a data logger as an example, the embodiments may be applied to a wide range of data signals in which an extraction algorithm is defined together with the similarity algorithm for determining when two signals are similar, without departing from the scope of the present teachings.

In the above-described embodiments, the input data stream is scalar in nature. That is, it consists of a single value on each clock cycle. However, the present teachings may be applied to vector input data streams. In such a data stream, there are a plurality of input data channels in which each channel is processed by an ADC to provide an input vector on each clock cycle. The trigger circuit that defines a start of a new EDS operates on one or more of the channels. The above-described teachings can be applied to such a vector data stream.

In the above-described embodiments, the original data stream may be recovered from the disk or other long term storage device without loss, except for any quantization errors introduced by digitizing the original analog signal. As noted above, the storage requirements for this original data stream may be in the tens of terabytes. In some applications, it is advantageous to be able to provide a compressed data stream using a lossy compression algorithm. There are two types of approximations that may be used to provide the compressed data stream. The first approximation replaces the IDSs with a count of the number of data samples in each IDS. This reduces each IDS to a code indicating that it is an IDS and the count. The second approximation replaces each EDS by the EDS in the RDS that includes that EDS. Each RDS includes a representative EDS, and the remainder of the EDSs associated with that RDS are similar to that EDS. Hence, each EDS in the data stream is replaced by the identity of the RDS in which that EDS is located. This approximation requires, however, that the database of RDSs be included in the data stream once. However, assuming that the average number of RDSs is much smaller than the number of EDSs, the level of compression is substantial. Each representative EDS may be replaced by a compressed version of that EDS. In compressing the representative EDS, a lossless compression algorithm may be used such as Entropy encoding. Alternatively, the representative EDS may be compressed using one of the lossy data compression algorithms known in the data compression arts. It should be noted that these conventional data compression techniques may include both lossless and lossy compression algorithms.

The embodiments may also be utilized as an analytical tool for understanding the signals in a prerecorded data set. In this case, the prerecorded data set is input to an apparatus analogous to the data recording apparatus 10 shown in FIG. 1. When the recorded data is already in digital form, the ADC 11 may be omitted. In such an application, the controller 15 may optionally control the rate at which data is input to the system. Accordingly, when there is insufficient time to compare a new EDS to each of the RDSs before the next new EDS must be processed, the controller 15 may merely stop the input of the data to allow the system to catch up.

When a compressed version of the prerecorded data is desired, the data set can be read in a second time after determining the RDSs to be used in the compressed data stream. The compressed data stream may then be output to disk 14.

As noted above, the controller 15 may be a conventional computer or a multi-processor. The matching of the EDSs to the RDSs is a process that may be increased in speed by utilizing a multi-processor, since the results of a match between a new EDS and one of the RDSs may be carried out in parallel with a match between that EDS and another of the RDSs. The multi-processor may be a conventional multiple core computer or a graphic processing board having thousands of cores, for example.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to an advantage.

Aspects of the present invention may be embodied as an apparatus, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit" or "system." Furthermore, aspects of the present invention may take the form of a computer program product embodied in one or more computer readable medium(s) having computer executable code embodied thereon.

While representative embodiments are disclosed herein, one skilled in the art appreciates that many variations that are in accordance with the present teachings are possible and remain within the scope of the appended claim set. The invention therefore is not to be restricted except within the scope of the appended claims.

What is claimed is:

1. A method of analyzing measurement data in a measurement data stream, the method comprising:
    sorting extracted data segments (EDSs) from initial data in an initial data stream into similarity clusters using an initial similarity algorithm for measuring similarity of the EDSs with reference data segments (RDSs) in the similarity clusters, respectively, wherein each RDS in each similarity cluster is an EDS representative of the EDSs in the similarity cluster;
    labeling the similarity clusters;
    sorting the EDSs or the RDSs of the labeled similarity clusters into sub-clusters using one or more sub-cluster similarity algorithms that are more restrictive or less restrictive than the initial similarity algorithm;
    identifying a search seed for each of the sub-clusters that is representative of the sub-cluster, wherein the search seed is one of the EDSs or the RDSs in each sub-cluster representative of the sub-cluster;
    sorting measurement EDSs from measurement data in a measurement data stream into measurement clusters using a measurement similarity algorithm for measuring similarity of the measurement EDSs with measurement RDSs in the measurement clusters, respectively, wherein each measurement RDS in each measurement cluster is a measurement EDS representative of the measurement EDSs in the measurement cluster;
    determining for each search seed a most similar one of the measurement EDSs or a most similar one of measurement RDSs with respect to the search seed;
    identifying the determined most similar one of the measurement EDSs or most similar one of the measurement RDSs for each search seed as a classification segment corresponding to the search seed;
    sorting new measurement EDSs or new measurement RDSs representative of the new measurement EDSs into classification clusters with the classification segments using a classification similarity algorithm;
    classifying all of the new measurement EDSs or the new measurement RDSs in each of the classification clusters the same as the corresponding classification segment; and
    determining whether at least one pattern of interest is in the measurement data stream based on the classification clusters.

2. The method of claim 1, wherein identifying the search seed for each of the sub-clusters comprises selecting one of the EDSs or one of the RDSs in each of the sub-clusters as the search seed.

3. The method of claim 2, wherein selecting one of the EDSs or one of the RDSs in each of the sub-clusters as the search seed, comprises:
    selecting a median EDS or a median RDS as the search seed.

4. The method of claim 1, wherein sorting the EDSs into the similarity clusters comprises:
    comparing the EDSs to initial RDSs using the initial similarity algorithm, each initial RDS corresponding to one of the similarity clusters;
    storing in an RDS database information identifying the EDSs that the initial similarity algorithm indicates are similar to one of the initial RDSs in association with the one of the initial RDSs; and
    creating an additional RDS for each of the EDSs that the initial similarity algorithm indicates is not similar to any of the initial RDSs, and storing in the RDS database information identifying each of the EDSs as the additional RDS.

5. The method of claim 4, wherein sorting the EDSs into similarity clusters using at least the initial similarity algorithm for measuring similarity of the EDSs, further comprises:
    sorting the EDSs into initial clusters using the initial similarity algorithm;
    dividing some of the initial clusters to form new similarity clusters having finer granularity with regard to similarity; and/or
    combining some of the initial clusters to form new similarity clusters having coarser granularity.

6. The method of claim 5, wherein dividing some of the initial clusters to form similarity clusters having finer granularity with regard to similarity comprises:
    identifying a lower threshold granularity;
    identifying the initial RDSs and the additional RDSs having associated EDSs that are too close in similarity based on the lower threshold granularity; and
    generating the similarity clusters by dividing the initial clusters of the identified initial RDSs and additional RDSs to form the new similarity clusters having finer granularity with regard to similarity.

7. The method of claim 5, wherein combining some of the initial clusters to form new clusters having coarser granularity with regard to similarity:
    identifying an upper threshold granularity;
    identifying the initial RDSs and the additional RDSs having associated EDSs that are too distant in similarity based on the upper threshold granularity; and
    generating the similarity clusters by combining selected ones of the initial clusters of the identified initial RDSs and additional RDSs to form the new similarity clusters having coarser granularity with regard to similarity.

8. The method of claim 1, wherein the determined most similar one of the measurement EDSs or most similar one of the measurement RDSs for each search seed is identified as a classification segment when the determined most similar one of the measurement EDSs or most similar one of the measurement RDSs is within a search threshold of the search seed.

9. The method of claim 8, wherein the search threshold is much larger in regard to distance in similarity than each of an initial similarity measure of the initial similarity algorithm and a sub-cluster similarity measure of a sub-cluster algorithm.

10. The method of claim 8, wherein the search threshold is larger than a classification similarity measure of the classification similarity algorithm.

11. The method of claim 1, wherein determining for each search seed the most similar one of the measurement EDSs or the most similar one of measurement RDSs comprises performing a nearest neighbor algorithm for each search seed.

12. The method of claim 1, further comprising:
sequentially receiving and storing portions of the initial data from the initial data stream in a buffer;
extracting the EDSs from the stored portions of the initial data stream;
subsequently sequentially receiving and storing portions of the measurement data from the measurement data stream in the buffer; and
extracting the measurement EDSs from the stored portions of the measurement data.

13. A system for recording and analyzing an input data stream,
the system comprising:
at least one processor;
a user interface in communication with the at least one processor;
at least one memory in communication with the at least one processor, the at least one memory storing instructions that, when executed by the processor, cause the processor to:
sort extracted data segments (EDSs) from initial data in the input data stream into similarity clusters using at least an initial similarity algorithm for measuring similarity of the EDSs with reference data segments (RDSs) in the similarity clusters, respectively, wherein each RDS in each similarity cluster is an EDS representative of the EDSs in the similarity cluster, and wherein each similarity cluster is labeled by a user via the user interface;
sort the EDSs or the RDSs of the labeled similarity clusters into sub-clusters using one or more sub-cluster similarity algorithms that are more restrictive or less restrictive than the initial similarity algorithm;
select one of the EDSs or one of the RDSs in each of the sub-clusters as a search seed that is representative of the sub-cluster;
sort measurement EDSs from measurement data in the input data stream into measurement clusters using a measurement similarity algorithm for measuring similarity of the measurement EDSs with measurement RDSs in the measurement clusters, respectively, wherein each measurement RDS in each measurement cluster is a measurement EDS representative of the measurement EDSs in the measurement cluster;
determine for each search seed a most similar one of the measurement EDSs or a most similar one of measurement RDSs with respect to the search seed;
identify the determined most similar one of the measurement EDSs or most similar one of the measurement RDSs for each search seed as a classification segment corresponding to the search seed;
sort new measurement EDSs or new measurement RDSs representative of the new measurement EDSs into classification clusters with the classification segments using a classification similarity algorithm;
classify all of the new measurement EDSs or the new measurement RDSs in each of the classification clusters the same as the corresponding classification segment; and
determine whether there is at least one pattern in the input data stream based on the classification clusters.

14. The system of claim 13, wherein selecting one of the EDSs or one of the RDSs in each of the sub-clusters as the search seed, comprises selecting a median EDS or a median RDS as the search seed.

15. The system of claim 13, wherein sorting the EDSs into the similarity clusters comprises:
comparing the EDSs to initial RDSs using the initial similarity algorithm, each initial RDS corresponding to one of the similarity clusters;
storing in an RDS database information identifying the EDSs that the initial similarity algorithm indicates are similar to one of the initial RDSs in association with the one of the initial RDSs; and
creating an additional RDS for each of the EDSs that the initial similarity algorithm indicates is not similar to any of the initial RDSs, and storing in the RDS database information identifying each of the EDSs as the additional RDS.

16. The system of claim 13, wherein the determined most similar one of the measurement EDSs or most similar one of the measurement RDSs for each search seed is identified as a classification segment when the determined most similar one of the measurement EDSs or most similar one of the measurement RDSs is within a search threshold of the search seed.

17. The system of claim 16, wherein the search threshold is much larger in regard to distance in similarity than each of an initial similarity measure of the initial similarity algorithm and a sub-cluster similarity measure of a sub-cluster algorithm.

18. The system of claim 16, wherein the search threshold is larger than a classification similarity measure of the classification similarity algorithm.

19. The system of claim 13, wherein the instructions cause the at least one processor to determine for each search seed the most similar one of the measurement EDSs or the most similar one of measurement RDSs by performing a nearest neighbor algorithm for each search seed.

20. A non-transitory computer readable medium storing instructions for recording and analyzing an input data stream that, when executed by a processor, cause the processor to:
sort extracted data segments (EDSs) from initial data in the input data stream into similarity clusters using at least an initial similarity algorithm for measuring similarity of the EDSs with reference data segments (RDSs) in the similarity clusters, respectively, wherein each RDS in each similarity cluster is an EDS representative of the EDSs in the similarity cluster, and wherein each similarity cluster is labeled by a user via a user interface;
sort the EDSs or the RDSs of the labeled similarity clusters into sub-clusters using one or more sub-cluster similarity algorithms that are more restrictive or less restrictive than the initial similarity algorithm;
select one of the EDSs or one of the RDSs in each of the sub-clusters as a search seed that is representative of the sub-cluster;

sort measurement EDSs from measurement data in the input data stream into measurement clusters using a measurement similarity algorithm for measuring similarity of the measurement EDSs with measurement RDSs in the measurement clusters, respectively, wherein each measurement RDS in each measurement cluster is a measurement EDS representative of the measurement EDSs in the measurement cluster;

determine for each search seed a most similar one of the measurement EDSs or a most similar one of measurement RDSs with respect to the search seed;

identify the determined most similar one of the measurement EDSs or most similar one of the measurement RDSs for each search seed as a classification segment corresponding to the search seed;

sort new measurement EDSs or new measurement RDSs representative of the new measurement EDSs into classification clusters with the classification segments using a classification similarity algorithm;

classify all of the new measurement EDSs or the new measurement RDSs in each of the classification clusters the same as the corresponding classification segment; and determine whether there is at least one pattern in the input data stream based on the classification clusters.

* * * * *